US012786994B2

(12) United States Patent
Takeda et al.

(10) Patent No.: US 12,786,994 B2
(45) Date of Patent: Nov. 3, 2026

(54) RANDOM ACCESS ON ENHANCED SECONDARY UPLINK CELL

(71) Applicant: QUALCOMM Incorporated, San Diego, CA (US)

(72) Inventors: Kazuki Takeda, Minato-ku (JP); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 18/476,124

(22) Filed: Sep. 27, 2023

(65) Prior Publication Data

US 2025/0106843 A1 Mar. 27, 2025

(51) Int. Cl.
*H04W 4/00* (2018.01)
*H04L 5/00* (2006.01)
*H04L 5/14* (2006.01)
*H04W 72/1268* (2023.01)

(52) U.S. Cl.
CPC ....... *H04W 72/1268* (2013.01); *H04L 5/0051* (2013.01); *H04L 5/14* (2013.01)

(58) Field of Classification Search
None
See application file for complete search history.

(56) References Cited

U.S. PATENT DOCUMENTS

2020/0084806 A1* 3/2020 Orsino .................. H04W 24/10
2022/0385381 A1 12/2022 Molavianjazi et al.
2023/0232420 A1 7/2023 Babaei
2023/0354331 A1* 11/2023 MolavianJazi ......... H04L 5/001

OTHER PUBLICATIONS

International Search Report and Written Opinion—PCT/US2024/043904—ISA/EPO—Nov. 19, 2024.
Qualcomm Inc: "CA Enhancements", 3GPP RAN Rel-19 Workshop, RWS-230182, 3rd Generation Partnership Project, Mobile Competence Centre, 650, Route Des Lucioles, F-06921 Sophia-Antipolis Cedex, France, No. Taipei, Taiwan, Jun. 15, 2023-Jun. 16, 2023, Jun. 11, 2023, Agenda Item: 5, XP052509921, 5 Pages, p. 4.

* cited by examiner

*Primary Examiner* — Zewdu A Beyen
(74) *Attorney, Agent, or Firm* — Holland & Hart LLP/ QUALCOMM Incorporated

(57) ABSTRACT

Methods, systems, and devices for wireless communications are described. A user equipment (UE) may receive a first indication of a first cell associated with a first uplink carrier and a first downlink carrier and a second cell associated with a second uplink carrier, wherein the second cell comprises an uplink-only cell. The UE may receive, via the first downlink carrier of the first cell or via the second downlink carrier associated with a third cell, a second indication of subsequent communications to be performed via the first uplink carrier of the first cell, the second uplink carrier of the second cell, or both. The UE may perform the subsequent communications according to the second indication, wherein the subsequent communications comprise at least one of access communications, uplink communications, or both.

30 Claims, 18 Drawing Sheets

| | |
|---|---|
| • downlinkConfigCommon | DownlinkConfigCommonSIB |
| • uplinkConfigCommon | UplinkConfigCommonSIB |
| • supplementaryUplink | UplinkConfigCommonSIB |
| • tdd-UL-DL-ConfigurationCommon | TDD-UL-DL-ConfigCommon |
| • ssb-PositionBurst | Bit strings |
| • channelAccessMode-r16 | CHOICE{dynamic or semi-static} |
| • eSUL | UplinkConfigCommonSIB |
| • ssb-PositionBursteSUL | Bit Strings |
| • tdd-UL-DL-ConfigurationCommoneSUL | TDD-UL-DL-ConfigCommon |
| • channelAccessModeeSUL | CHOICE {dynamic or semi-static} |

305

300

FIG. 3

| | |
|---|---|
| • downlinkConfigCommon | DownlinkConfigCommonSIB |
| • uplinkConfigCommon | UplinkConfigCommonSIB |
| • supplementaryUplink | UplinkConfigCommonSIB |
| • tdd-UL-DL-ConfigurationCommon | TDD-UL-DL-ConfigCommon |
| • ssb-PositionBurst | Bit strings |
| • eSUL-Config | SEQUENCE { |
|   • eSUL-ULConfig | UplinkConfigCommonSIB |
|   • ssb-PositionBursteSUL | Bit Strings |
|   • tdd-UL-DL-ConfigurationCommoneSUL | TDD-UL-DL-ConfigCommon |
|   • channelAccessModeeSUL | CHOICE {dynamic or semi-static} |
| • } | |

405

400

FIG. 4

| | |
|---|---|
| • downlinkConfigCommon | DownlinkConfigCommonSIB |
| • uplinkConfigCommon | UplinkConfigCommonSIB |
| • supplementaryUplink | UplinkConfigCommonSIB |
| • tdd-UL-DL-ConfigurationCommon | TDD-UL-DL-ConfigCommon |
| • ssb-PositionBurst | Bit strings |
| • ServingCellConfigCommonSIBeSUL | SEQUENCE { |
|   • uplinkConfigCommon | UplinkConfigCommonSIB |
|   • tdd-UL-DL-ConfigurationCommon | TDD-UL-DL-ConfigCommon |
|   • ssb-PositionBurst | Bit Strings |
|   • channelAccessModeeSUL | CHOICE {dynamic or semi-static} |
| • } | |

505

500

FIG. 5

RANDOM ACCESS ON ENHANCED SECONDARY UPLINK CELL

FIELD OF TECHNOLOGY

The following relates to wireless communications, including random access on enhanced secondary uplink cell.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support random access on enhanced secondary uplink (eSUL) cell. For example, the described techniques provide for a unified framework supporting an eSUL within a wireless network. Broadly, the eSUL may be considered an uplink carrier of a cell that does not have an associated downlink carrier (e.g., is an uplink-only cell). A user equipment (UE) may receive a first indication for a first cell. The first cell may be a traditional cell in that the cell includes both an uplink carrier and a downlink carrier. The first indication may also identify a second cell (e.g., an eSUL). The second cell may be an uplink-only cell that does not have an associated downlink carrier. The UE may receive a second indication for subsequent communications to be performed. The second indication may be received via the downlink carrier of the first cell or via a different downlink carrier from a third cell. The second indication may schedule the subsequent communications. The UE may perform the subsequent communications via the eSUL and/or via the uplink carrier of the first cell. The subsequent communications may include uplink/downlink communications and/or random access channel communications.

A method for wireless communications by a UE is described. The method may include receiving a first indication of a first cell associated with a first uplink carrier and a first downlink carrier and a second cell associated with a second uplink carrier, where the second cell includes an uplink-only cell, receiving, via the first downlink carrier of the first cell or via the second downlink carrier associated with a third cell, a second indication of subsequent communications to be performed via the first uplink carrier of the first cell, the second uplink carrier of the second cell, or both, and performing the subsequent communications according to the second indication, where the subsequent communications include at least one of access communications, uplink communications, or both.

A UE for wireless communications is described. The UE may include one or more memories storing processor executable code, and one or more processors coupled with the one or more memories. The one or more processors may individually or collectively operable to execute the code to cause the UE to receive a first indication of a first cell associated with a first uplink carrier and a first downlink carrier and a second cell associated with a second uplink carrier, where the second cell includes an uplink-only cell, receive, via the first downlink carrier of the first cell or via the second downlink carrier associated with a third cell, a second indication of subsequent communications to be performed via the first uplink carrier of the first cell, the second uplink carrier of the second cell, or both, and perform the subsequent communications according to the second indication, where the subsequent communications include at least one of access communications, uplink communications, or both.

Another UE for wireless communications is described. The UE may include means for receiving a first indication of a first cell associated with a first uplink carrier and a first downlink carrier and a second cell associated with a second uplink carrier, where the second cell includes an uplink-only cell, means for receiving, via the first downlink carrier of the first cell or via the second downlink carrier associated with a third cell, a second indication of subsequent communications to be performed via the first uplink carrier of the first cell, the second uplink carrier of the second cell, or both, and means for performing the subsequent communications according to the second indication, where the subsequent communications include at least one of access communications, uplink communications, or both.

A non-transitory computer-readable medium storing code for wireless communications is described. The code may include instructions executable by a processor to receive a first indication of a first cell associated with a first uplink carrier and a first downlink carrier and a second cell associated with a second uplink carrier, where the second cell includes an uplink-only cell, receive, via the first downlink carrier of the first cell or via the second downlink carrier associated with a third cell, a second indication of subsequent communications to be performed via the first uplink carrier of the first cell, the second uplink carrier of the second cell, or both, and perform the subsequent communications according to the second indication, where the subsequent communications include at least one of access communications, uplink communications, or both.

In some examples of the method, user equipment (UEs), and non-transitory computer-readable medium described herein, receiving the second indication may include operations, features, means, or instructions for receiving a grant scheduling an uplink communications via the first uplink carrier of the first cell, the second uplink carrier of the second cell, or both, where the subsequent communications includes the uplink communications.

In some examples of the method, user equipment (UEs), and non-transitory computer-readable medium described herein, the grant includes a cross-carrier scheduling grant, a multi-cell scheduling grant, or both.

Some examples of the method, user equipment (UEs), and non-transitory computer-readable medium described herein may further include operations, features, means, or instructions for identifying a first feedback process associated with uplink communications via the first cell and a second feedback process associated with uplink communications via the second cell.

Some examples of the method, user equipment (UEs), and non-transitory computer-readable medium described herein may further include operations, features, means, or instructions for receiving a reference signal transmitted via the first downlink carrier of the first cell, via the second downlink carrier associated with a third cell, or both and performing timing and power control operations using the reference signal.

In some examples of the method, user equipment (UEs), and non-transitory computer-readable medium described herein, performing the subsequent communications may include operations, features, means, or instructions for transmitting uplink communications via the second uplink carrier of the second cell according or receiving downlink communications via the first downlink carrier of the first cell according to a half-duplexing scheme.

In some examples of the method, user equipment (UEs), and non-transitory computer-readable medium described herein, performing the subsequent communications may include operations, features, means, or instructions for performing either simultaneous transmissions on the first uplink carrier of the first cell and transmissions on the second uplink carrier of the second cell according to a simultaneous transmit antenna switching scheme, or non-simultaneous transmissions on the first uplink carrier of the first cell and transmissions on the second uplink carrier of the second cell according to an uplink transmit antenna switching scheme.

In some examples of the method, user equipment (UEs), and non-transitory computer-readable medium described herein, receiving the second indication may include operations, features, means, or instructions for receiving a system information message identifying first access resources for access to the first cell via the first uplink carrier and second access resources for access to the second cell via the second uplink carrier and accessing the first cell or the second cell according to the first access resources or second access resources.

Some examples of the method, user equipment (UEs), and non-transitory computer-readable medium described herein may further include operations, features, means, or instructions for identifying a first access channel occasion corresponding to the first access resources and a second access channel occasion corresponding to the second access resources according to an access scheme based on the subsequent communications being scheduled in a time domain duplexing (TDD) scheme.

In some examples of the method, user equipment (UEs), and non-transitory computer-readable medium described herein, identifying, based on the first indication, information for an uplink configuration, a TDD uplink/downlink configuration, a set of candidate synchronization signal block indices, or any combination thereof, for the second uplink carrier of the second cell.

In some examples of the method, user equipment (UEs), and non-transitory computer-readable medium described herein, the information may be carried in an eSUL carrier sequence indication.

In some examples of the method, user equipment (UEs), and non-transitory computer-readable medium described herein, the information may be carried in a serving cell configuration common system information block eSUL carrier indication.

A method for wireless communications by a network entity is described. The method may include transmitting, to a UE, a first indication of a first cell associated with a first uplink carrier and a first downlink carrier and a second cell associated with a second uplink carrier, where the second cell includes an uplink-only cell, transmitting, to the UE and via the first downlink carrier of the first cell or via a second downlink carrier associated with a third cell, a second indication of subsequent communications to be performed via the first uplink carrier of the first cell, the second uplink carrier of the second cell, or both, and performing the subsequent communications with the UE according to the second indication.

A network entity for wireless communications is described. The network entity may include one or more memories storing processor executable code, and one or more processors coupled with the one or more memories. The one or more processors may individually or collectively operable to execute the code to cause the network entity to transmit, to a UE, a first indication of a first cell associated with a first uplink carrier and a first downlink carrier and a second cell associated with a second uplink carrier, where the second cell includes an uplink-only cell, transmit, to the UE and via the first downlink carrier of the first cell or via a second downlink carrier associated with a third cell, a second indication of subsequent communications to be performed via the first uplink carrier of the first cell, the second uplink carrier of the second cell, or both, and perform the subsequent communications with the UE according to the second indication.

Another network entity for wireless communications is described. The network entity may include means for transmitting, to a UE, a first indication of a first cell associated with a first uplink carrier and a first downlink carrier and a second cell associated with a second uplink carrier, where the second cell includes an uplink-only cell, means for transmitting, to the UE and via the first downlink carrier of the first cell or via a second downlink carrier associated with a third cell, a second indication of subsequent communications to be performed via the first uplink carrier of the first cell, the second uplink carrier of the second cell, or both, and means for performing the subsequent communications with the UE according to the second indication.

A non-transitory computer-readable medium storing code for wireless communications is described. The code may include instructions executable by a processor to transmit, to a UE, a first indication of a first cell associated with a first uplink carrier and a first downlink carrier and a second cell associated with a second uplink carrier, where the second cell includes an uplink-only cell, transmit, to the UE and via the first downlink carrier of the first cell or via a second downlink carrier associated with a third cell, a second indication of subsequent communications to be performed via the first uplink carrier of the first cell, the second uplink carrier of the second cell, or both, and perform the subsequent communications with the UE according to the second indication.

In some examples of the method, network entities, and non-transitory computer-readable medium described herein, transmitting the second indication may include operations, features, means, or instructions for transmitting a grant scheduling an uplink communications with the UE via the first uplink carrier of the first cell, the second uplink carrier of the second cell, or both, where the subsequent communications includes the uplink communications.

In some examples of the method, network entities, and non-transitory computer-readable medium described herein, the grant includes a cross-carrier scheduling grant, a multi-cell scheduling grant, or both.

Some examples of the method, network entities, and non-transitory computer-readable medium described herein may further include operations, features, means, or instructions for identifying a first feedback process associated with uplink communications via the first cell and a second feedback process associated with uplink communications via the second cell.

Some examples of the method, network entities, and non-transitory computer-readable medium described herein may further include operations, features, means, or instructions for transmitting a reference signal transmitted to the UE via the first downlink carrier and performing timing and power control operations with the UE using the reference signal.

In some examples of the method, network entities, and non-transitory computer-readable medium described herein, performing the subsequent communications may include operations, features, means, or instructions for receiving uplink communications from the UE via the second uplink carrier of the second cell or transmitting downlink communications to the UE via the first downlink carrier of the first cell according to a half-duplexing scheme.

In some examples of the method, network entities, and non-transitory computer-readable medium described herein, transmitting the second indication may include operations, features, means, or instructions for transmitting a system information message to the UE identifying first access resources for access to the first cell via the first uplink carrier and second access resources for access to the second cell via the second uplink carrier, where the UE accesses the first cell or the second cell according to the first access resources or second access resources.

Some examples of the method, network entities, and non-transitory computer-readable medium described herein may further include operations, features, means, or instructions for identifying a first access channel occasion corresponding to the first access resources and a second access channel occasion corresponding to the second access resources according to an access scheme based on the subsequent communications being scheduled in a TDD scheme.

In some examples of the method, network entities, and non-transitory computer-readable medium described herein, identifying, based on the first indication, information for an uplink configuration, a TDD uplink/downlink configuration, a set of candidate synchronization signal block indices, or any combination thereof, for the second uplink carrier of the second cell.

In some examples of the method, network entities, and non-transitory computer-readable medium described herein, the information may be carried in an eSUL carrier sequence indication.

In some examples of the method, network entities, and non-transitory computer-readable medium described herein, the information may be carried in a serving cell configuration common system information block eSUL carrier indication.

BRIEF DESCRIPTION OF THE DRAWINGS

FIG. 3 shows an example of a message format that supports random access on eSUL cell in accordance with one or more aspects of the present disclosure.

FIG. 4 shows an example of a message format that supports random access on eSUL cell in accordance with one or more aspects of the present disclosure.

FIG. 5 shows an example of a message format that supports random access on eSUL cell in accordance with one or more aspects of the present disclosure.

DETAILED DESCRIPTION

Wireless networks may use a secondary uplink carrier (SUL) cell for communications between a user equipment (UE) and the network. The network may use the SUL in a cell having a downlink carrier and an uplink carrier (e.g., DL+UL+SUL). That is, the SUL may be set up as a secondary UL carrier in a cell having both uplink and downlink carriers. Such networks may not provide for a framework supporting an enhanced SUL (eSUL) where the SUL is located in a cell that does not have an associated downlink carrier.

Accordingly, aspects of the described techniques provide for a unified framework supporting an eSUL within a wireless network. Broadly, the eSUL may be considered an uplink carrier of a cell where the cell does not have an associated downlink carrier (e.g., is an uplink-only cell). This may include a user equipment (UE) being signaled or otherwise indicated with a first indication for a first cell. The first cell may be a traditional cell in that the cell includes both an uplink carrier and a downlink carrier. The first indication may also identify a second cell (e.g., an eSUL). The second cell may not have an associated downlink carrier such that the second cell is an uplink-only cell. The UE may receive a second indication for subsequent communications to be performed. The indication may be received via the downlink carrier of the first cell or via a different downlink carrier from a third cell. The second indication may schedule the subsequent communications. The UE may perform the subsequent communications via the eSUL and/or via the uplink carrier of the first cell. The subsequent communications may include uplink/downlink communications and/or random access channel communications.

Aspects of the disclosure are initially described in the context of wireless communications systems. Aspects of the disclosure are further illustrated by and described with reference to apparatus diagrams, system diagrams, and flowcharts that relate to random access on eSUL cell.

Figure 1:
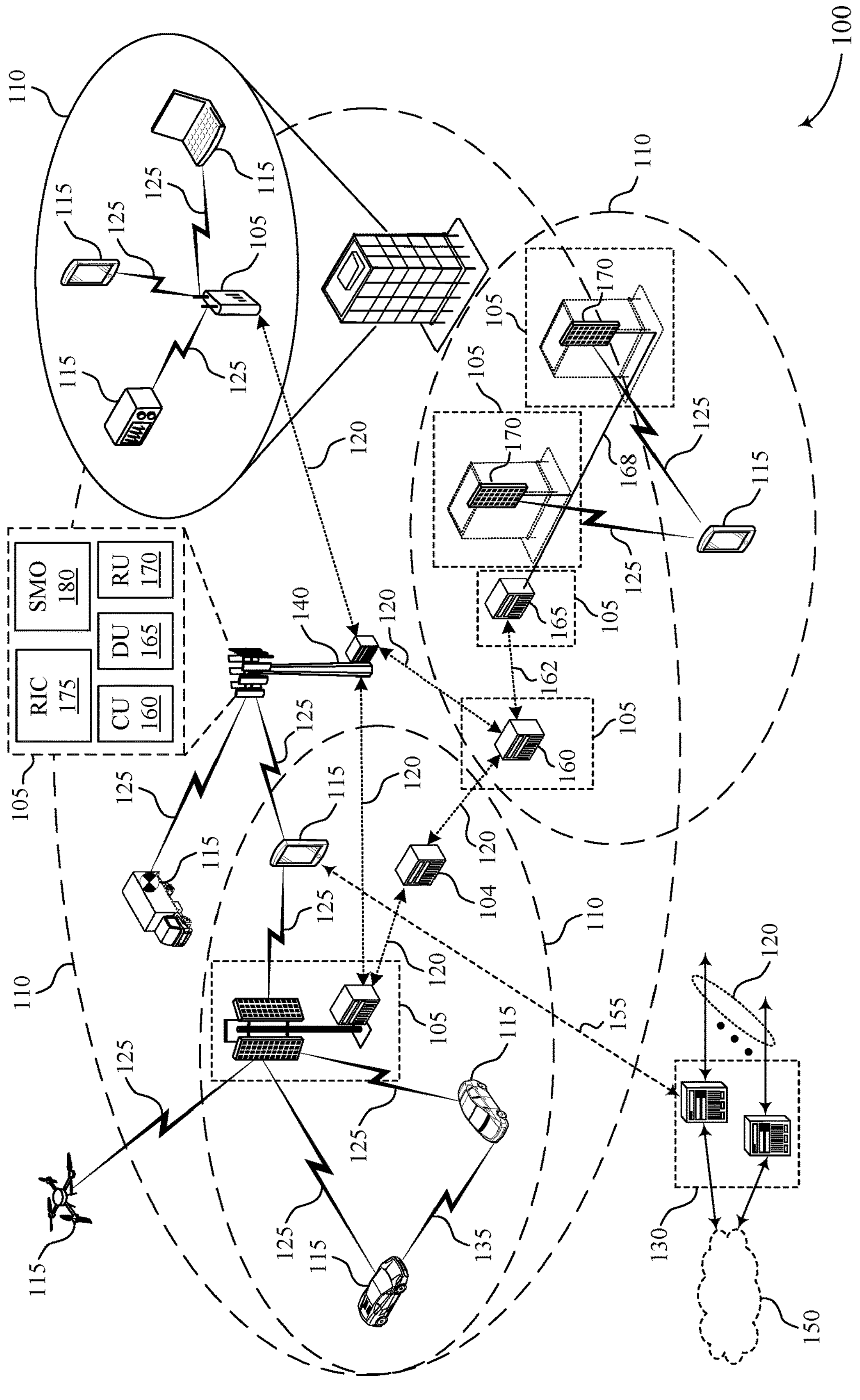
FIG. 1 shows an example of a wireless communications system that supports random access on enhanced secondary uplink (eSUL) cell in accordance with one or more aspects of the present disclosure.

FIG. 1 shows an example of a wireless communications system 100 that supports random access on eSUL cell in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support random access on eSUL cell as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback indicating precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive a first indication of a first cell associated with a first uplink carrier and a first downlink carrier and a second cell associated with a second uplink carrier, wherein the second cell comprises an uplink-only cell. The UE 115 may receive, via the first downlink carrier of the first cell or via the second downlink carrier associated with a third cell, a second indication of subsequent communications to be performed via the first uplink carrier of the first cell, the second uplink carrier of the second cell, or both. The UE 115 may perform the subsequent communications according to the second indication, wherein the subsequent communications comprise at least one of access communications, uplink communications, or both.

A network entity 105 may transmit, to a UE 115, a first indication of a first cell associated with a first uplink carrier and a first downlink carrier and a second cell associated with a second uplink carrier, wherein the second cell comprises an uplink-only cell. The network entity 105 may transmit, to the UE 115 and via the first downlink carrier of the first cell or via a second downlink carrier associated with a third cell, a second indication of subsequent communications to be performed via the first uplink carrier of the first cell, the second uplink carrier of the second cell, or both. The network entity 105 may perform the subsequent communications with the UE 115 according to the second indication.

Figure 2:
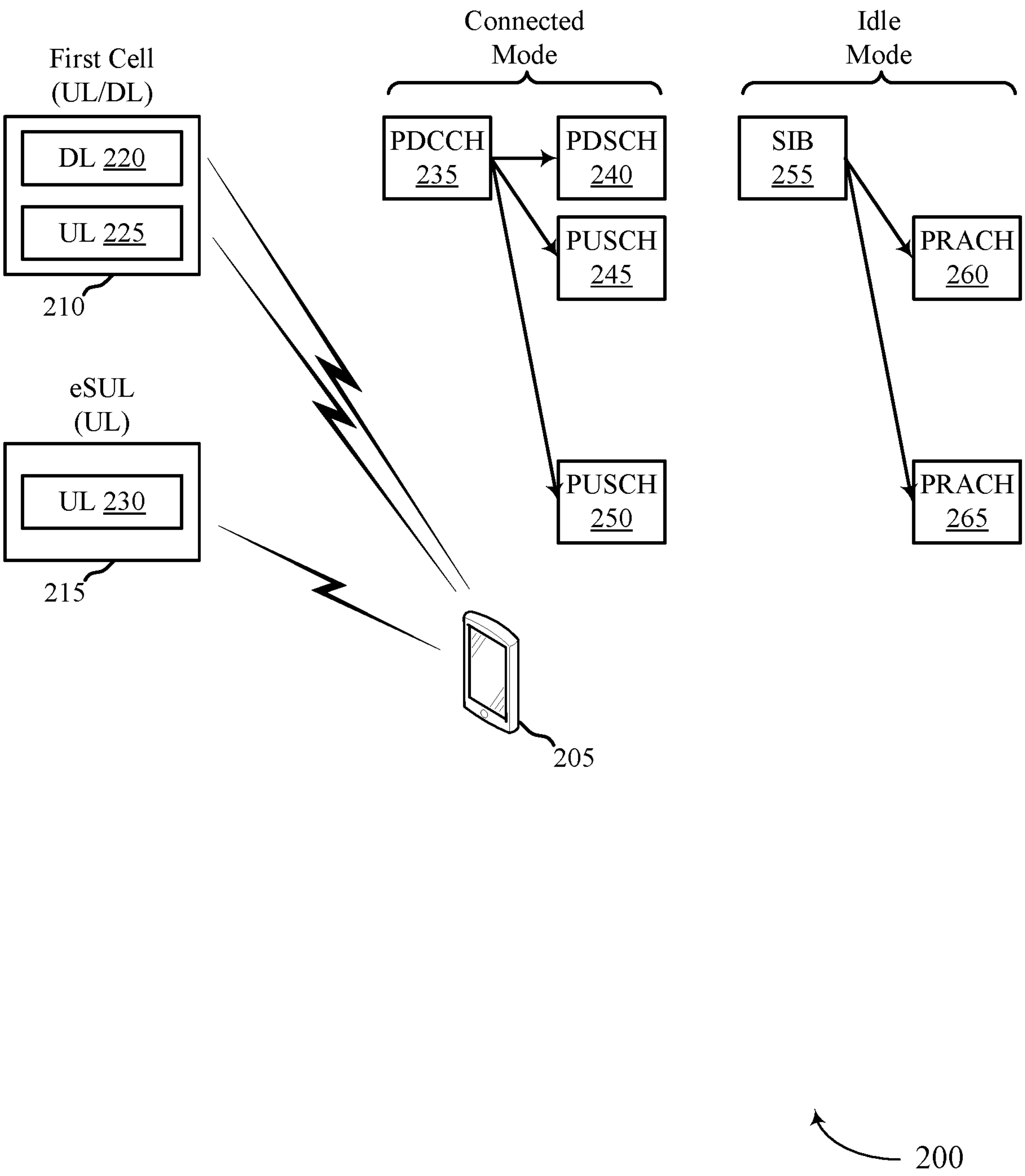
FIG. 2 shows an example of a wireless communications system that supports random access on eSUL cell in accordance with one or more aspects of the present disclosure.

FIG. 2 shows an example of a wireless communications system 200 that supports random access on eSUL cell in accordance with one or more aspects of the present disclosure. Wireless communications system 200 may implement aspects of wireless communications system 100. Wireless communications system 200 may include a UE 205, a network entity 210, and a network entity 215, which may be examples of the corresponding devices described herein. For example, the network entity 210 may be an example of a first cell associated with a first uplink carrier 225 and a first downlink carrier 220. The network entity 215 may be an example of a second cell that is associated with a second uplink carrier 230 (e.g., the second cell may be an uplink-only cell that does not have a downlink carrier).

Wireless networks may support different configurations for providing secondary uplink carriers for the UE 205. One example may include support for a SUL to be configured for the UE to support enhanced uplink traffic from the UE 205. The SUL configuration generally includes a cell having a downlink carrier and two uplink carriers, with the second uplink carrier being designated as the SUL carrier used to supplement the uplink communications. Another example may include support for UL-CA where multiple cells are configured to support the uplink communications. In the UL-CA configuration, conventional cells are assigned to support the uplink carriers (e.g., via their uplink carriers) while the downlink carrier of the primary cell and/or the downlink carrier of the secondary cell is used for scheduling the uplink carriers.

However, these SUL/UL-CA scenarios are treated differently (e.g., scheduled/configured differently) by the network. This is due, in part, to each scenario having or otherwise supporting different capabilities/functions within the wireless network. For example, the SUL does not support simultaneous uplink transmissions and/or multi-cell scheduling, where the UL-CA does support this. The SUL may support random access while in idle mode, wherein the UL-CA may not support random access via the secondary uplink carrier. HARQ processes are different as well, with the SUL scenario being configured with one HARQ space for the UL/SUL carriers of the serving cell and the UL-CA scenario using independent HARQ spaces for each CC. The scheduling mechanism used by each scenario is also different (e.g., an UL/SUL indicated in the DCI used for SUL and a carrier indicator field (CIF) being used in the DCI to distinguish the uplink carrier scheduling). Lastly, uplink transmit switching is supported in the SUL scenario but only supported in UL-CA when the 'switchedUL' or 'dualUL' indicators are configured.

Both SUL and UL-CA scenarios includes at least one cell being configured for the UE 205 to support enhanced uplink communications. The SUL configuration includes one cell having a downlink carrier, an uplink carrier and a downlink carrier, or a downlink carrier along with the uplink carrier and SUL carrier. The UL-CA configuration includes either only a downlink carrier or a downlink carrier and an uplink carrier. Multiple cells (each having downlink or downlink and uplink carriers) are configured for the UE 205 to support the enhanced uplink communications.

Accordingly, aspects of the techniques described herein provide for a unified framework approach using an eSUL. The eSUL is generally a second cell configured to support uplink communications with the UE 205. The eSUL is an uplink-only cell in that the eSUL does not have a downlink carrier. This is shown in FIG. 2 with the network entity 210 being first cell having both downlink and uplink carriers and the network entity 215 being only an uplink carrier.

This may include the UE 205 receiving or otherwise obtaining a first indication associated with a first cell (e.g., the network entity 210) associated with a first downlink carrier 220 and a first uplink carrier 225 and a second cell (e.g., the network entity 215) associated with a second uplink carrier 230. As discussed, the second cell is an uplink-only cell in that the second cell does not have an integrated downlink carrier. The first indication may be received via RRC signaling and/or via higher-layer signaling. The first indication may generally identify, select, or otherwise configure the first cell and the second cell to support communications with the UE 205. More specific examples of the first indication are discussed with regards to FIGS. 3-5.

The UE 205 may receive or otherwise obtain a second indication of subsequent communications to be performed via the first uplink carrier 225 and/or via the second uplink carrier 230. The second indication may be received via the first downlink carrier 220 of the first cell and/or via a second downlink carrier of a third cell (e.g., a different cell, other than the first cell, that has a downlink carrier). The UE 205 may perform the subsequent communications according to the second indication. In some aspects, the subsequent communications may be uplink communications and/or access communications.

One example of the uplink communications may include the UE 205 receiving a grant scheduling the uplink communications via the first uplink carrier 225 and/or via the second uplink carrier 230. The grant may be received while the UE 205 is operating in a connected mode (e.g., of a power-saving mode). In some aspects, the eSUL may be considered an UL-CC of UL-CA, but without a downlink carrier in the cell.

For example, the grant may include a PDCCH 235 (e.g., a DCI-based grant) received from the first cell via the first downlink carrier 220 (in this non-limiting example). The grant may schedule PDSCH 240 (e.g., downlink communications) via the first downlink carrier 220, PUSCH 245 (e.g., uplink communications) via the first uplink carrier 225, and/or PUSCH 250 (e.g., uplink communications) via the second uplink carrier 230. The grant may carry or otherwise convey an indication of a CIF field used to distinguish subsequent communications scheduled on the first cell from the subsequent communications scheduled on the second cell (e.g., the eSUL). For example, a CIF field set to '0' may indicate that the subsequent communications are scheduled via the first cell and a CIF field set to '1' may indicate that the subsequent communications are scheduled via the second cell, or vice versa.

In some examples, scheduling the first cell and eSUL in this manner may support both cross-carrier scheduling and/or multi-cell scheduling. For example, the grant (e.g., PDCCH 235) may be a cross-carrier grant and/or may be a multi-cell scheduling grant. Scheduling in this manner may support independent HARQ spaces being configured for each UL/eSUL. That is, a first feedback process (e.g., HARQ) may be associated with uplink communications via the first cell and a second feedback processing may be associated with uplink communications via the second cell.

For timing/power control functions, scheduling in this manner may include the eSUL (e.g., the second cell) being configured with reference signal(s) in the first cell or in a different cell (e.g., the third cell). That is, since the eSUL has not associated downlink carrier, the downlink carrier of the first cell and/or the third cell may be used for channel performance measurements and reporting, which may be used for power control operations (among many other operations) for the eSUL. For example, the UE 205 may receive a reference signal transmitted via the first downlink carrier 220 and/or via a second downlink carrier of the second cell and use the reference signal(s) to perform the timing and power control operations for the second uplink carrier 230. That is, the channel performance measurements may be used to select uplink transmit power, MCS, repetitions, and the like, for uplink communications performed via the second uplink carrier 230 of the second cell.

In some aspects, such connected-mode scheduling may support half-duplex capabilities between the eSUL and a downlink cell (e.g., a cell having a downlink carrier, which may be the downlink carrier of the first cell or the third cell). For example, the UE 205 may transmit uplink communications via the second uplink carrier 230 or receive downlink communications via the first downlink carrier 220 (or a downlink carrier of a third cell) according to a half-duplexing scheme. The half-duplexing scheme may be triggered and/or identified via the grant and/or via other signaling means.

Connected-mode scheduling (e.g., via PDCCH 235) may also support the UE 205 either performing simultaneous uplink transmissions via the first uplink carrier 225 and the second uplink carrier 230 or uplink transmit switching (e.g., options ½). For example, the UE 205 may perform simultaneous transmissions on the first uplink carrier 225 and the second uplink carrier 230 or performing non-simultaneous transmissions on the first uplink carrier 225 of the first cell and transmissions on the second uplink carrier 230. The simultaneous transmissions may be performed according to a simultaneous transmit antenna switching scheme. The non-simultaneous transmissions may be performed according to an uplink transmit antenna switching scheme.

One example of the access communications may include the UE 205 receiving a system information message (e.g., SIB 255) that identifies first access resources (e.g., PRACH 260) for access to the first cell via the first uplink carrier 225 and second access resources (e.g., PRACH 265) for access to the second cell via the second uplink carrier 230. In some aspects, the UE 205 may be operating in an idle mode when monitoring for and receiving the system information message. The SIB 255 may carry the information (e.g., identify the resources) for the eSUL as well as the first uplink carrier 225 that can be used for random access. The UE may then identify or otherwise select the first uplink carrier 225 or the second uplink carrier 230 for random access (e.g., via the associated PRACH resources). In some examples, this may include the UE 205 identifying or otherwise determining a first access channel occasion (e.g., a first PRACH occasion) for the first access resources (e.g., PRACH 260) and a second access channel occasion (e.g., a second PRACH occasion) for the second access resources (e.g., PRACH 265).

Although the unified framework illustrated in FIG. 2 shows the eSUL configured in the second cell that is different from the first cell, it is to be understood that the second cell may be configured as a virtual cell within the first cell in some examples. That is, the first cell may have two uplink carriers and the second uplink carrier may be scheduled or otherwise treated as a separate cell (e.g., the eSUL) that is scheduled or otherwise configured similar to the features discussed above. For example, the eSUL may again be treated as an UL-CC of UL-CA that has no downlink carrier when the UE 205 is operating in the connected mode. When the UE 205 is operating in the idle mode, the access features discussed above may also be applied to the uplink carrier and eSUL carrier of the cell.

In some aspects, PRACH selection may be based on the UE being configured with subsequent communications in a TDD band using the eSUL. That is, the PRACH occasion selection techniques described herein may be based on whether the serving cell (e.g., the first cell) and/or the eSUL (e.g., the second cell) are configured with a TDD UL-DL configuration, such as using the messaging scheme discussed below with reference to FIGS. 3-5.

FIG. 3 shows an example of a message format 300 that supports random access on eSUL cell in accordance with one or more aspects of the present disclosure. Aspects of message format 300 may implement aspects of wireless communications system 100 and/or wireless communications system 200. Aspects of message format 300 may be implemented at or implemented by a UE and/or network entity, which may be examples of the corresponding devices described herein. For example, the network entity (or network entities) may be associated with a first cell or a second cell used for wireless communications with a UE.

As discussed above, aspects of the techniques described herein provide for configuring a UE with (e.g., via a first indication) a first cell having both uplink and downlink carriers and a second cell that is an uplink-only cell (e.g., has an uplink carrier, but does not have a downlink carrier). The UE may receive a second indication for subsequent uplink communications. The subsequent communications may be uplink communications and/or access communications (e.g., via the first uplink carrier of the first cell and/or via the second uplink carrier of the second cell). The uplink communications may be scheduled via a DCI grant carried on the first downlink carrier of the first cell and/or carried on a second downlink carrier of a third cell (e.g., since the second cell does not have a downlink carrier). The access communications may include a SIB indicating the PRACH resources (e.g., access resources) for the uplink carrier of the first cell and/or for the uplink carrier of the second cell (e.g., the eSUL).

Generally, the UE may generally select from all PRACH occasions when the access communications are via a paired spectrum or supplementary uplink band (e.g., for FDD-based networks). For TDD-based networks, the UE may select a PRACH occasion based on whether or not the UE is configured with a tdd-UL-DL-ConfigurationCommon parameter, along with other factors. Accordingly, for FDD and legacy SUL configurations, there is no instance where the PRACH occasion(s) are invalid. However, for the TDD networks the PRACH occasions are valid/invalid depending on one or more of the time domain resources for candidate SSBs of the cell, TDD UL-DL configuration of the cell, and/or the next channel occupancy times (e.g., for the cell(s) that have both uplink and downlink carriers).

Accordingly, in legacy SUL operations the carrier is always configured in an FDD band where the SUL is configured with uplink symbols in its frequency band. However, the eSUL discussed herein may be configured in both FDD and/or TDD operations and/or may be configured for operations in a shared or unlicensed radio frequency spectrum band. From the UE perspective, configurations in a TDD band may result in the eSUL being the cell that only has an uplink carrier. However, from the network perspective the eSUL is a cell/carrier/frequency that can have both downlink and uplink when configured for TDD operations. When the eSUL is configured in the TDD or unlicensed band, there are time-domain resources that are not available for uplink transmissions due to the SSB candidates, TDD UL-DL configuration, and/or the next channel occupancy time.

Thus, some techniques may use existing mechanisms for the eSUL when operating in the FDD band as all PRACH occasions are valid. However, such techniques may not be applicable when the eSUL is configured in a TDD or unlicensed band since all PRACH occasions may not be available for the UE (e.g., due to uplink/downlink/special symbol-level configuration of the TDD band). That is, the TDD UL-DL configurations are generally different for the first cell and the eSUL.

Accordingly, aspects of message format 300 may be implemented when configuring the UE with the first and second cells. That is, message format 300 illustrates one non-limiting example of a first indication that may be provided to the UE to configure or otherwise identify the first cell having both uplink and downlink carriers and the second cell that is an uplink-only cell (e.g., has not downlink carrier). In some aspects, message format 300 illustrates an example of a ServingCellConfigCommonSIB parameter (e.g., a configuration message 305) indicated via RRC signaling. However, it is to be understood that the features discussed regarding message format 300 may be equally applicable to a ServingCellConfigCommon parameter indicted via RRC signaling. That is, the eSUL features discussed with reference to message format 300 may be applied to the ServingCellConfigCommon parameter.

Generally, the ServingCellConfigCommonSIB/ServingCellConfigCommon parameters generally indicate the candidate SSB indices, the TDD UL-DL configuration, and the channel access mode for the serving cell (e.g., for the first cell, in this example). However, the configuration message 305 illustrates a non-limiting example of how both the serving cell (e.g., the first cell, in this example) and the eSUL (e.g., the second cell, in this example) are configured for the UE.

This may include the configuration message 305 indicating, in the first row, a "downlinkConfigCommon-DownlinkConfigCommonSIB" parameter that identifies various downlink resources being configured for the first cell. The second row may indicate an "uplinkConfigCommon-UplinkConfigCommonSIB" parameter that identifies the RACH, PUCCH, and PUSCH configuration for NUL carrier of the first cell. The third row may indicate a "supplementaryUplink-UplinkConfigCommonSIB" parameter that identifies the RACH, PUCCH, and PUSCH configuration for SUL carrier of the cell. That is, in the situation where the first cell has two uplink carriers, a primary uplink carrier (NUL) and a secondary uplink carrier (SUL), this third row may configure the SUL for the UE. However, it is to be understood that this third row may be deleted (e.g., not signaled) to the UE in the configuration message 305 since the UE is being configured with the eSUL of the second cell.

The fourth row may identify a "tdd-UL-DL-ConfigurationCommon-TDD-UL-DL-ConfigCommon" parameter, the fifth row may identify a "ssb-PistionInBurst-Bit strings" parameter, and the sixth row may identify a "channelAccessMode-r16-Choice (dynamic or semi-static). These three rows may generally identify the candidate SSB indices, the TDD UL-DL configuration, and channel access mode (e.g., in the unlicensed band) for the downlink carrier and for the uplink carrier (e.g., NUL) of the first cell (e.g., the serving cell, in this example).

However, the configuration message 305 also carries or otherwise conveys information used to identify, select, or otherwise configure the UE with the second cell having only the uplink carrier (e.g., the eSUL). That is, in addition to providing the uplink configuration for the eSUL, the configuration message 305 also provides the TDD UL-DL configuration and candidate SSB indices of the eSUL to the UE (e.g., the first indication includes an eSUL indication configuring the second cell for the UE).

For example, the seventh row may identify the "eSUL-UplinkConfigCommonSIB" parameter that identifies the RACH, PUCCH, and PUSCH configuration for the eSUL. The seventh row may identify a "ssb-PositionInBursteSUL-Bit strings" parameter, the eighth row may identify a "tdd-UL-DL-ConfigurationCommoneSUL-TDD-UL-DL-ConfigCommon" parameter, and the ninth row may identify a "channelAccessModeeSUL-CHOICE (dynamic or semi-static)" parameter. These three parameters may generally carry or otherwise convey information identifying the candidate SSB indices, the TDD UL-DL configuration, and the channel access mode for the cell/carrier/frequency configured as an eSUL (e.g., the second cell, in this example).

Accordingly, in some examples the first indication may carry or otherwise convey information identifying an uplink configuration, a TDD UL/DL configuration, and/or a set of candidate SSB indices, for both the serving cell (e.g., the first cell) and the eSUL (e.g., the second cell). This may enable the network to configure an idle mode UE with PRACH resources for both the first uplink carrier of the first cell (e.g., first access resources) and the second uplink carrier of the second cell (e.g., second access resources).

FIG. 4 shows an example of a message format 400 that supports random access on eSUL cell in accordance with one or more aspects of the present disclosure. Aspects of message format 400 may implement aspects of wireless communications system 100 and/or wireless communications system 200 and/or may implement aspects of message format 300. Aspects of message format 400 may be implemented at or implemented by a UE and/or network entity, which may be examples of the corresponding devices described herein. For example, the network entity (or network entities) may be associated with a first cell or a second cell used for wireless communications with a UE.

As discussed above, aspects of the techniques described herein provide for configuring a UE with (e.g., via a first indication) a first cell having both uplink and downlink carriers and a second cell that is an uplink-only cell (e.g., has an uplink carrier, but does not have a downlink carrier). The UE may receive a second indication for subsequent uplink communications and perform the subsequent communications according to the second indication. The subsequent communications may be uplink communications and/or access communications (e.g., via the first uplink carrier of the first cell and/or via the second uplink carrier of the second cell). The uplink communications may be scheduled via a DCI grant carried on the first downlink carrier of the first cell and/or carried on a second downlink carrier of a third cell (e.g., since the second cell does not have a downlink carrier). The access communications may include a SIB indicating the PRACH resources (e.g., access resources) for the uplink carrier of the first cell and/or for the uplink carrier of the second cell (e.g., the eSUL).

As discussed above, the eSUL discussed herein may be configured in both FDD and/or TDD operations and/or may be configured for operations in a shared or unlicensed radio frequency spectrum band. Accordingly, aspects of message format 400 may be implemented when configuring the UE with the first and second cells. That is, message format 400 illustrates one non-limiting example of a first indication that may be provided to the UE to configure or otherwise identify the first cell having both uplink and downlink carriers and the second cell that is an uplink-only cell (e.g., has not downlink carrier). In some aspects, message format 400 illustrates an example of a ServingCellConfigCommonSIB parameter (e.g., a configuration message 405) indicated via RRC signaling. However, it is to be understood that the features discussed regarding message format 400 may be equally applicable to a ServingCellConfigCommon parameter indicted via RRC signaling. That is, the eSUL features discussed with reference to message format 400 may be applied to the ServingCellConfigCommon parameter.

Generally, the ServingCellConfigCommonSIB/ServingCellConfigCommon parameters generally indicate the candidate SSB indices, the TDD UL-DL configuration, and the channel access mode for the serving cell (e.g., for the first cell, in this example). However, the configuration message 405 illustrates a non-limiting example of how both the serving cell (e.g., the first cell, in this example) and the eSUL (e.g., the second cell, in this example) are configured for the UE.

Generally, the parameters indicted in rows 1-5 are similar to the parameters discussed regarding rows 1-6 of the configuration message 305 discussed above (e.g., minus the channel access mode). These parameters generally identify uplink and/or downlink resources, TDD UL-DL configurations, and candidate SSB indices for the first cell.

However, the configuration message 405 illustrates a non-limiting example of how the first indication carries or otherwise conveys information used to identify, select, or otherwise configure the UE with the second cell having only the uplink carrier (e.g., the eSUL). That is, in addition to providing the uplink configuration for the eSUL, the configuration message 405 also provides the TDD UL-DL configuration and candidate SSB indices of the eSUL to the UE (e.g., the first indication includes an eSUL indication configuring the second cell for the UE). However, this information is provided in an "eSUL configuration" sequence indication used to configure the UE with one or more second cells (e.g., one or more eSULs). For example, if multiple eSULs are associated with a cell that has a downlink carrier, the eSUL configuration may be a list of configurations where each entry of the list provides necessary parameters such as the uplink configuration, the TDD UL-DL configuration, and/or the candidate SSB indices for the eSUL in that entry. For example, the UE may be configured with an "eSULToAddModList-SEQUENCE (Size (1, . . . , maxNrofeSULs) of eSUL-Config" indicating and/or otherwise identifying how many and/or which cell(s) are configured as eSUL for the UE. Each eSUL identified may be associated with a unique identifier or sequence that is used to distinguish between different eSULs. Each identifier or sequence may then be used to provide information identifying each eSUL being configured for the UE.

For a given eSUL sequence, the configuration message 405 may include an "eSUL-ULConfig-UplinkConfigCommonSIB" parameter may identify the RACH, PUCCH, and PUSCH configuration for the eSUL. The "ssb-PositionIn-Burst-Bit strings" parameter, the "tdd-UL-DL-ConfigurationCommon-TDD-UL-DL-ConfigCommon" parameter, and the "channelAccessModeeSUL-CHOICE (dynamic or semi-static)" parameter may identify the candidate SSB indices, the TDD UL-DL configuration, and the channel access mode for the cell/carrier/frequency configured for the eSUL (e.g., the second cell, in this example) associated with that eSUL sequence.

Accordingly, in some examples the first indication may carry or otherwise convey information identifying an uplink configuration, a TDD UL/DL configuration, and/or a set of candidate SSB indices, for both the serving cell (e.g., the first cell) and for one or more eSULs (e.g., the second cell(s)). This may enable the network to configure an idle mode UE with PRACH resources for both the first uplink carrier of the first cell (e.g., first access resources) and the second uplink carrier of the second cell (e.g., second access resources), or additional eSULs. The configuration message 405 illustrates a non-limiting example of, when multiple eSULs are associated with a cell that has a downlink carrier, the configuration for the eSULs can be provided in a list configuration where each entry of the list (e.g., each eSUL sequence) provides the necessary parameters (e.g., such as uplink configuration, TDD UL-DL configuration, and the like) for the eSUL in that particular entry.

It is to be understood that references to the second cell (e.g., the eSUL) being associated with a downlink carrier does not refer to the eSUL having a downlink carrier. Instead, it is to be understood that the eSUL(s) may be configured as separate cell(s) relative to the serving cell having both uplink and downlink carriers. However, the eSUL(s) may be linked to or otherwise associated with a different cell that does have a downlink carrier. The downlink carrier of that cell may then be used for scheduling, reference signal, or other functions typically associated with a downlink carrier of a serving cell. For example, the downlink carrier of the other cell(s) may be used for channel performance and measurement operations, power control operations, and the like, for the second uplink carrier of the second cell.

FIG. 5 shows an example of a message format 500 that supports random access on eSUL cell in accordance with one or more aspects of the present disclosure. Aspects of message format 500 may implement aspects of wireless communications system 100 and/or wireless communications system 200 and/or may implement aspects of message format 300 and/or message format 400. Aspects of message format 500 may be implemented at or implemented by a UE and/or network entity, which may be examples of the corresponding devices described herein. For example, the network entity (or network entities) may be associated with a first cell or a second cell used for wireless communications with a UE.

As discussed above, aspects of the techniques described herein provide for configuring a UE with (e.g., via a first indication) a first cell having both uplink and downlink carriers and a second cell that is an uplink-only cell (e.g., has an uplink carrier, but does not have a downlink carrier). The UE may receive a second indication for subsequent uplink communications and perform the subsequent communications according to the second indication. The subsequent communications may be uplink communications and/or access communications (e.g., via the first uplink carrier of the first cell and/or via the second uplink carrier of the second cell). The uplink communications may be scheduled via a DCI grant carried on the first downlink carrier of the first cell and/or carried on a second downlink carrier of a third cell (e.g., since the second cell does not have a downlink carrier). The access communications may include a SIB indicating the PRACH resources (e.g., access resources) for the uplink carrier of the first cell and/or for the uplink carrier of the second cell (e.g., the eSUL).

As discussed above, the eSUL discussed herein may be configured in both FDD and/or TDD operations and/or may be configured for operations in a shared or unlicensed radio frequency spectrum band. Accordingly, aspects of message format 500 may be implemented when configuring the UE with the first and second cells. That is, message format 500 illustrates one non-limiting example of a first indication that may be provided to the UE to configure or otherwise identify the first cell having both uplink and downlink carriers and the second cell that is an uplink-only cell (e.g., has not downlink carrier). In some aspects, message format 500 illustrates an example of a ServingCellConfigCommonSIB parameter (e.g., a configuration message 505) indicated via RRC signaling. However, it is to be understood that the features discussed regarding message format 500 may be equally applicable to a ServingCellConfigCommon parameter indicted via RRC signaling. That is, the eSUL features discussed with reference to message format 500 may be applied to the ServingCellConfigCommon parameter.

Generally, the ServingCellConfigCommonSIB/ServingCellConfigCommon parameters generally indicate the candidate SSB indices, the TDD UL-DL configuration, and the channel access mode for the serving cell (e.g., for the first cell, in this example). However, the configuration message 505 illustrates a non-limiting example of how both the serving cell (e.g., the first cell, in this example) and the eSUL (e.g., the second cell, in this example) are configured for the UE. In particular, the configuration message 505 illustrates a non-limiting example of the ServingCellConfigCommonSIB parameter carries all the parameter for RACH, candidate SSBs, TDD UL-DL configuration, and channel access for the eSUL.

Generally, the parameters indicted in rows 1-5 are similar to the parameters discussed regarding rows 1-6 of the configuration message 305 discussed above (e.g., minus the channel access mode). These parameters generally identify uplink and/or downlink resources, TDD UL-DL configurations, and candidate SSB indices for the first cell (e.g., the serving cell of the UE).

However, the configuration message 505 illustrates a non-limiting example of how the first indication carries or otherwise conveys information used to identify, select, or otherwise configure the UE with the second cell having only the uplink carrier (e.g., the eSUL). That is, in addition to providing the uplink configuration for the eSUL, the configuration message 505 also provides the TDD UL-DL configuration and candidate SSB indices of the eSUL to the UE (e.g., the first indication includes an eSUL indication configuring the second cell for the UE). However, this information is provided in an "ServingCellConfigCommon-SIBeSUL" indication used to configure the UE with one or more second cells (e.g., one or more eSULs). For example, if multiple eSULs are associated with a cell that has a downlink carrier, the eSUL configuration may be a list of configurations where each entry of the list provides necessary parameters such as the uplink configuration, the TDD UL-DL configuration, and/or the candidate SSB indices for the eSUL in that entry. For example, the UE may be configured with an "ServingCellConfigCommonSIBeSUL-SEQUENCE" indicating and/or otherwise identifying how many and/or which cell(s) are configured as eSUL for the UE. Each eSUL identified may be associated with a unique identifier or sequence that is used to distinguish between different eSULs. Each identifier or sequence may then be used to provide information identifying each eSUL being configured for the UE.

For a given eSUL sequence, the configuration message 505 may include an "ULConfigCommon-UplinkConfig-CommonSIB" parameter that may identify the RACH, PUCCH, and PUSCH configuration for the eSUL. The "ssb-PositionInBurst-Bit strings" parameter, the "tdd-UL-DL-ConfigurationCommon-TDD-UL-DL-ConfigCommon" parameter, and the "channelAccessModeeSUL-CHOICE (dynamic or semi-static)" parameters may identify the candidate SSB indices, the TDD UL-DL configuration, and the channel access mode for the cell/carrier/frequency configured for the eSUL (e.g., the second cell, in this example) associated with that eSUL sequence, respectively.

Accordingly, in some examples the first indication may carry or otherwise convey information identifying an uplink configuration, a TDD UL/DL configuration, and/or a set of candidate SSB indices, for both the serving cell (e.g., the first cell) and for one or more eSULs (e.g., the second cell(s)). This may enable the network to configure an idle mode UE with PRACH resources for both the first uplink carrier of the first cell (e.g., first access resources) and the second uplink carrier of the second cell (e.g., second access resources), or additional eSULs. The configuration message 505 illustrates a non-limiting example of, when multiple eSULs are associated with a cell that has a downlink carrier, the configuration for the eSULs can be provided in a list configuration where each entry of the list (e.g., each eSUL sequence) provides the necessary parameters (e.g., such as uplink configuration, TDD UL-DL configuration, and the like) for the eSUL in that particular entry.

Figure 6:
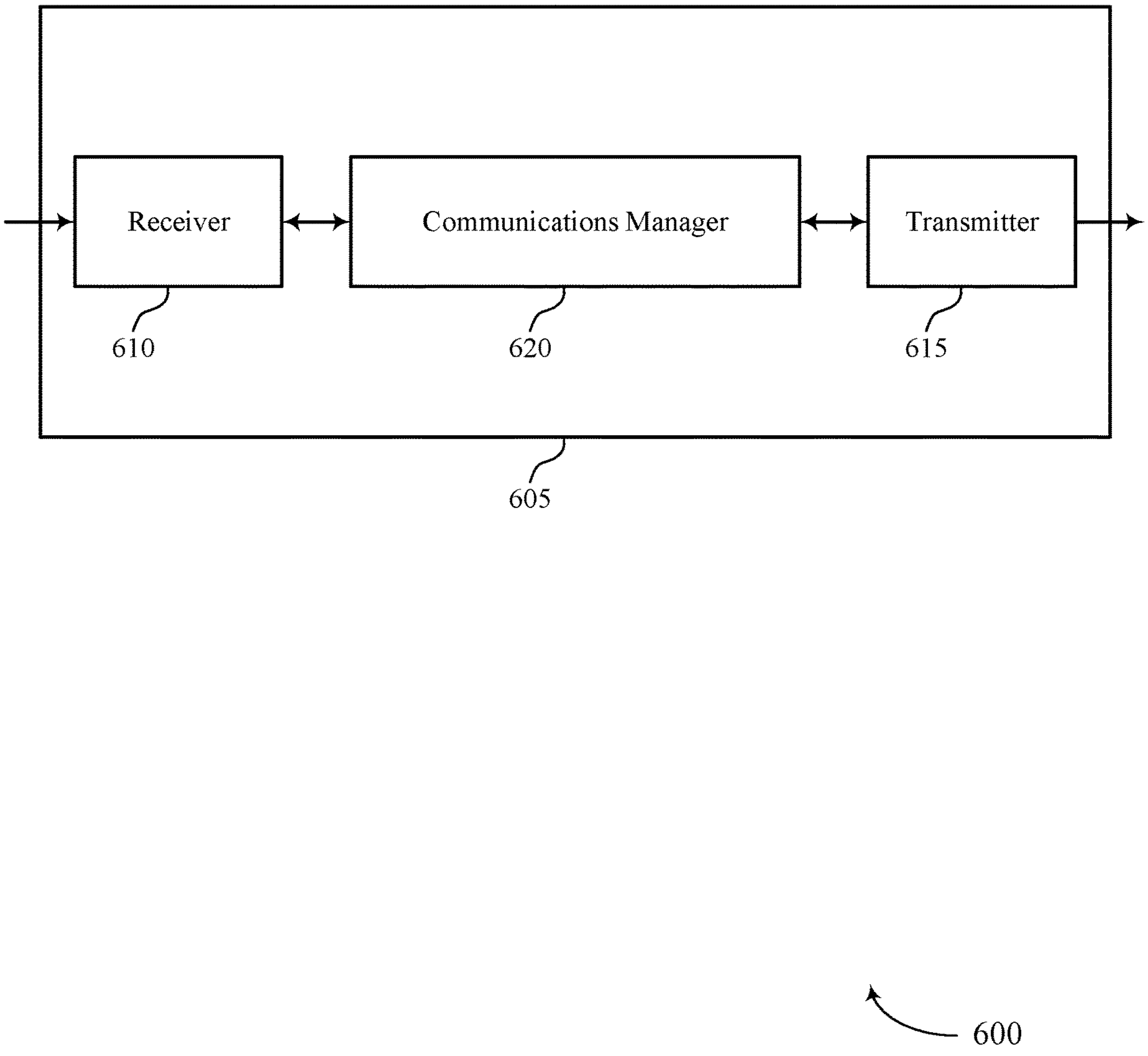
FIGS. 6 and 7 show block diagrams of devices that support random access on eSUL cell in accordance with one or more aspects of the present disclosure.

FIG. 6 shows a block diagram 600 of a device 605 that supports random access on eSUL cell in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to random access on eSUL cell). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to random access on eSUL cell). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of random access on eSUL cell as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory). For example, the communications manager 620 may be configured to receive or transmit messages or other signaling as described herein via a transceiver (e.g., the receiver 610 and/or transmitter 615).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving a first indication of a first cell associated with a first uplink carrier and a first downlink carrier and a second cell associated with a second uplink carrier, where the second cell includes an uplink-only cell. The communications manager 620 is capable of, configured to, or operable to support a means for receiving, via the first downlink carrier of the first cell or via the second downlink carrier associated with a third cell, a second indication of subsequent communications to be performed via the first uplink carrier of the first cell, the second uplink carrier of the second cell, or both. The communications manager 620 is capable of, configured to, or operable to support a means for performing the subsequent communications according to the second indication, where the subsequent communications include at least one of access communications, uplink communications, or both.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for configuring a UE with a serving cell having both uplink and downlink carriers as well as an eSUL having only an uplink carrier. The eSUL may be separately configured for the UE (e.g., relative to the serving cell) via RRC signaling carrying or conveying the eSUL parameters for a single eSUL and/or for multiple eSULs.

Figure 7:
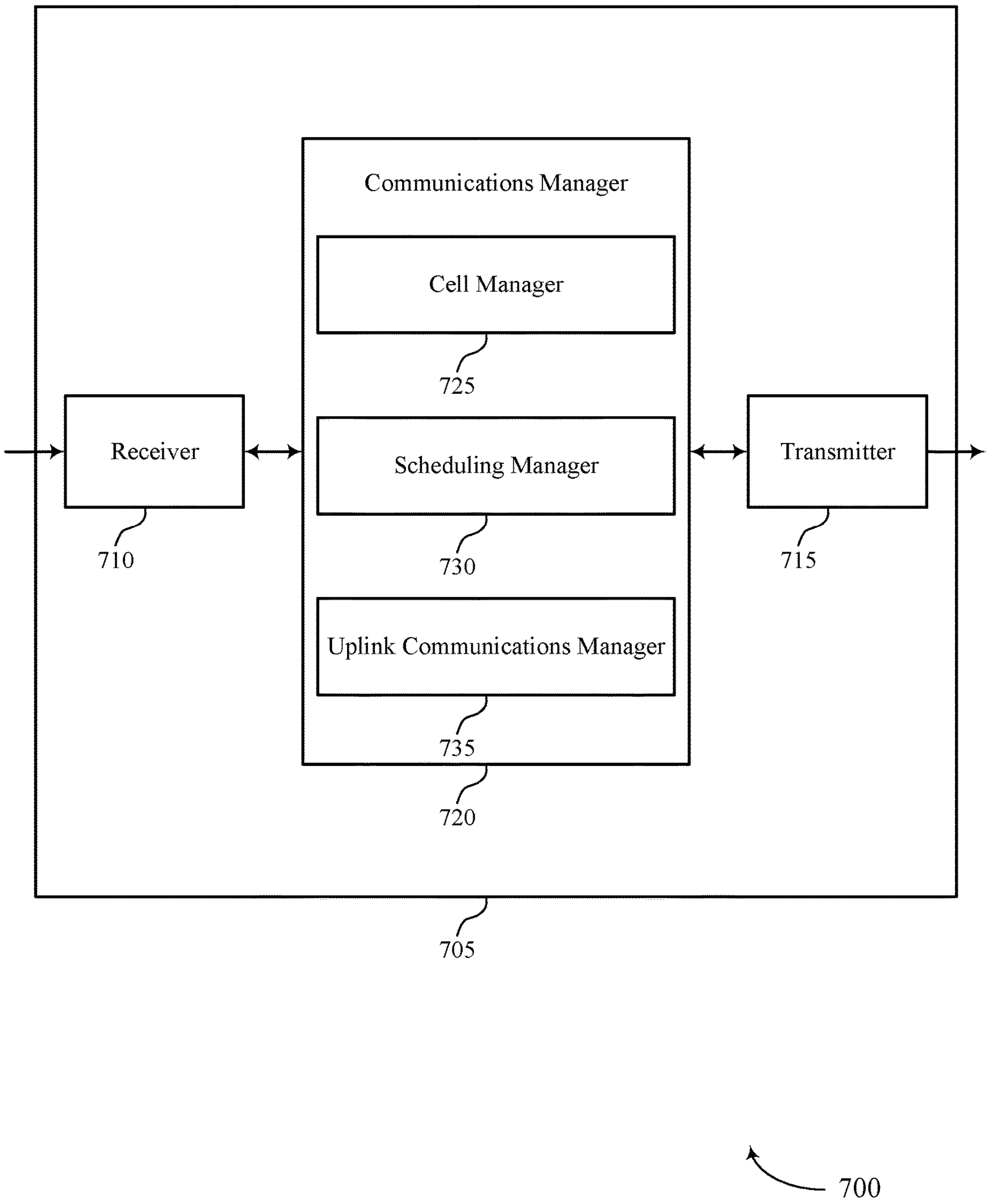

FIG. 7 shows a block diagram 700 of a device 705 that supports random access on eSUL cell in accordance with one or more aspects of the present disclosure. The device 705 may be an example of aspects of a device 605 or a UE 115 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to random access on eSUL cell). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to random access on eSUL cell). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of random access on eSUL cell as described herein. For example, the communications manager 720 may include a cell manager 725, a scheduling manager 730, an uplink communications manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The cell manager 725 is capable of, configured to, or operable to support a means for receiving a first indication of a first cell associated with a first uplink carrier and a first downlink carrier and a second cell associated with a second uplink carrier, where the second cell includes an uplink-only cell. The scheduling manager 730 is capable of, configured to, or operable to support a means for receiving, via the first downlink carrier of the first cell or via the second downlink carrier associated with a third cell, a second indication of subsequent communications to be performed via the first uplink carrier of the first cell, the second uplink carrier of the second cell, or both. The uplink communications manager 735 is capable of, configured to, or operable to support a means for performing the subsequent communications according to the second indication, where the subsequent communications include at least one of access communications, uplink communications, or both.

Figure 8:
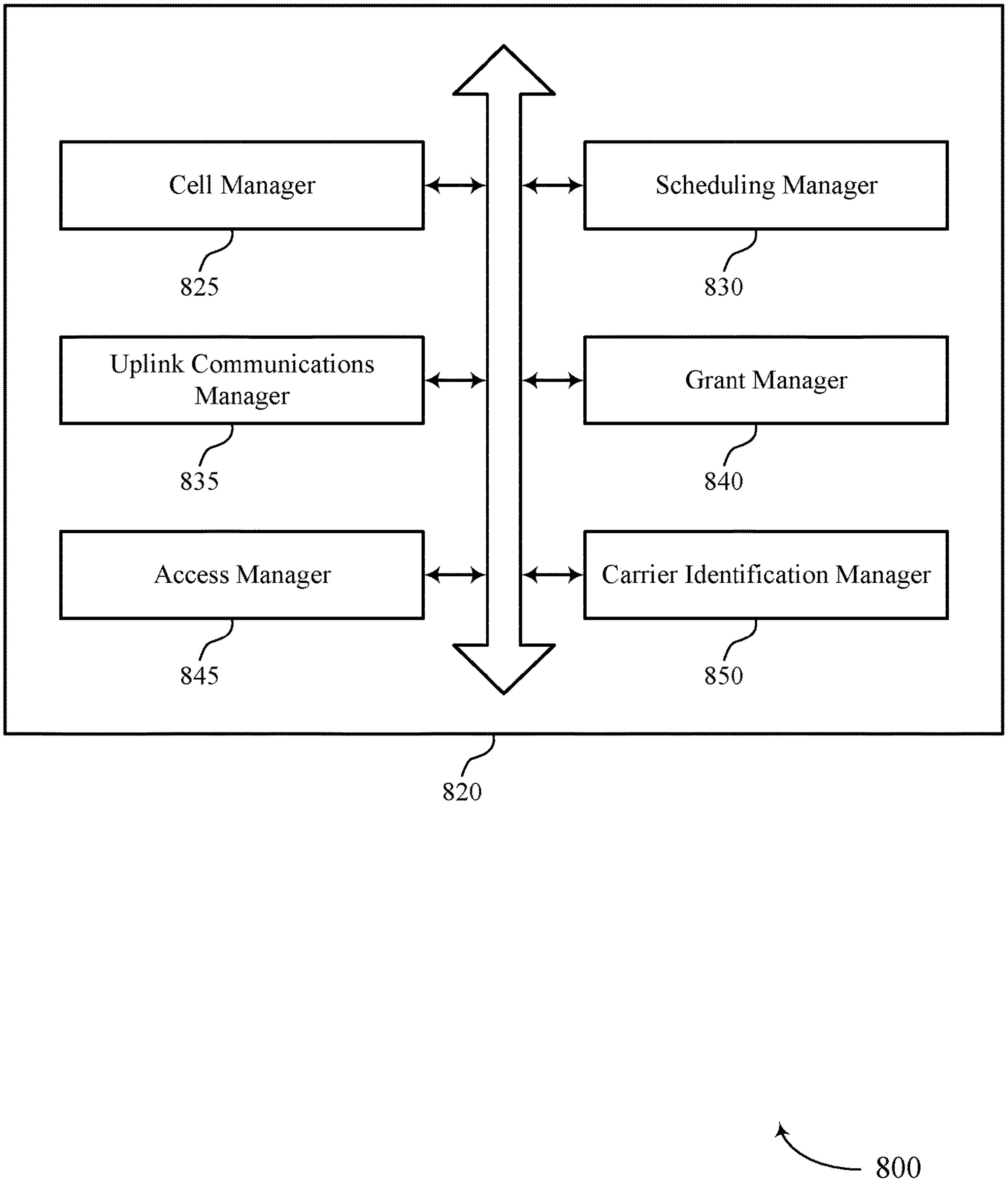
FIG. 8 shows a block diagram of a communications manager that supports random access on eSUL cell in accordance with one or more aspects of the present disclosure.

FIG. 8 shows a block diagram 800 of a communications manager 820 that supports random access on eSUL cell in accordance with one or more aspects of the present disclosure. The communications manager 820 may be an example of aspects of a communications manager 620, a communications manager 720, or both, as described herein. The communications manager 820, or various components thereof, may be an example of means for performing various aspects of random access on eSUL cell as described herein. For example, the communications manager 820 may include a cell manager 825, a scheduling manager 830, an uplink communications manager 835, a grant manager 840, an access manager 845, a carrier identification manager 850, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The cell manager 825 is capable of, configured to, or operable to support a means for receiving a first indication of a first cell associated with a first uplink carrier and a first downlink carrier and a second cell associated with a second uplink carrier, where the second cell includes an uplink-only cell. The scheduling manager 830 is capable of, configured to, or operable to support a means for receiving, via the first downlink carrier of the first cell or via the second downlink carrier associated with a third cell, a second indication of subsequent communications to be performed via the first uplink carrier of the first cell, the second uplink carrier of the second cell, or both. The uplink communications manager 835 is capable of, configured to, or operable to support a means for performing the subsequent communications according to the second indication, where the subsequent communications include at least one of access communications, uplink communications, or both.

In some examples, to support receiving the second indication, the grant manager 840 is capable of, configured to, or operable to support a means for receiving a grant scheduling an uplink communications via the first uplink carrier of the first cell, the second uplink carrier of the second cell, or both, where the subsequent communications includes the uplink communications. In some examples, the grant includes a cross-carrier scheduling grant, a multi-cell scheduling grant, or both.

In some examples, the grant manager 840 is capable of, configured to, or operable to support a means for identifying a first feedback process associated with uplink communications via the first cell and a second feedback process associated with uplink communications via the second cell. In some examples, the grant manager 840 is capable of, configured to, or operable to support a means for receiving a reference signal transmitted via the first downlink carrier of the first cell, via the second downlink carrier associated with a third cell, or both. In some examples, the grant manager 840 is capable of, configured to, or operable to support a means for performing timing and power control operations using the reference signal.

In some examples, to support performing the subsequent communications, the grant manager 840 is capable of, configured to, or operable to support a means for transmitting uplink communications via the second uplink carrier of the second cell according or receiving downlink communications via the first downlink carrier of the first cell according to a half-duplexing scheme. In some examples, to support performing the subsequent communications, the grant manager 840 is capable of, configured to, or operable to support a means for performing either simultaneous transmissions on the first uplink carrier of the first cell and transmissions on the second uplink carrier of the second cell according to a simultaneous transmit antenna switching scheme, or non-simultaneous transmissions on the first uplink carrier of the first cell and transmissions on the second uplink carrier of the second cell according to an uplink transmit antenna switching scheme.

In some examples, to support receiving the second indication, the access manager 845 is capable of, configured to, or operable to support a means for receiving a system information message identifying first access resources for access to the first cell via the first uplink carrier and second access resources for access to the second cell via the second uplink carrier. In some examples, to support receiving the second indication, the access manager 845 is capable of, configured to, or operable to support a means for accessing the first cell or the second cell according to the first access resources or second access resources.

In some examples, the access manager 845 is capable of, configured to, or operable to support a means for identifying a first access channel occasion corresponding to the first access resources and a second access channel occasion corresponding to the second access resources according to an access scheme based on the subsequent communications being scheduled in a TDD scheme.

In some examples, the carrier identification manager 850 is capable of, configured to, or operable to support a means for identifying, based on the first indication, information for an uplink configuration, a TDD uplink/downlink configuration, a set of candidate synchronization signal block indices, or any combination thereof, for the second uplink carrier of the second cell. In some examples, the information is carried in an eSUL carrier sequence indication. In some examples, the information is carried in a serving cell configuration common system information block eSUL carrier indication.

Figure 9:
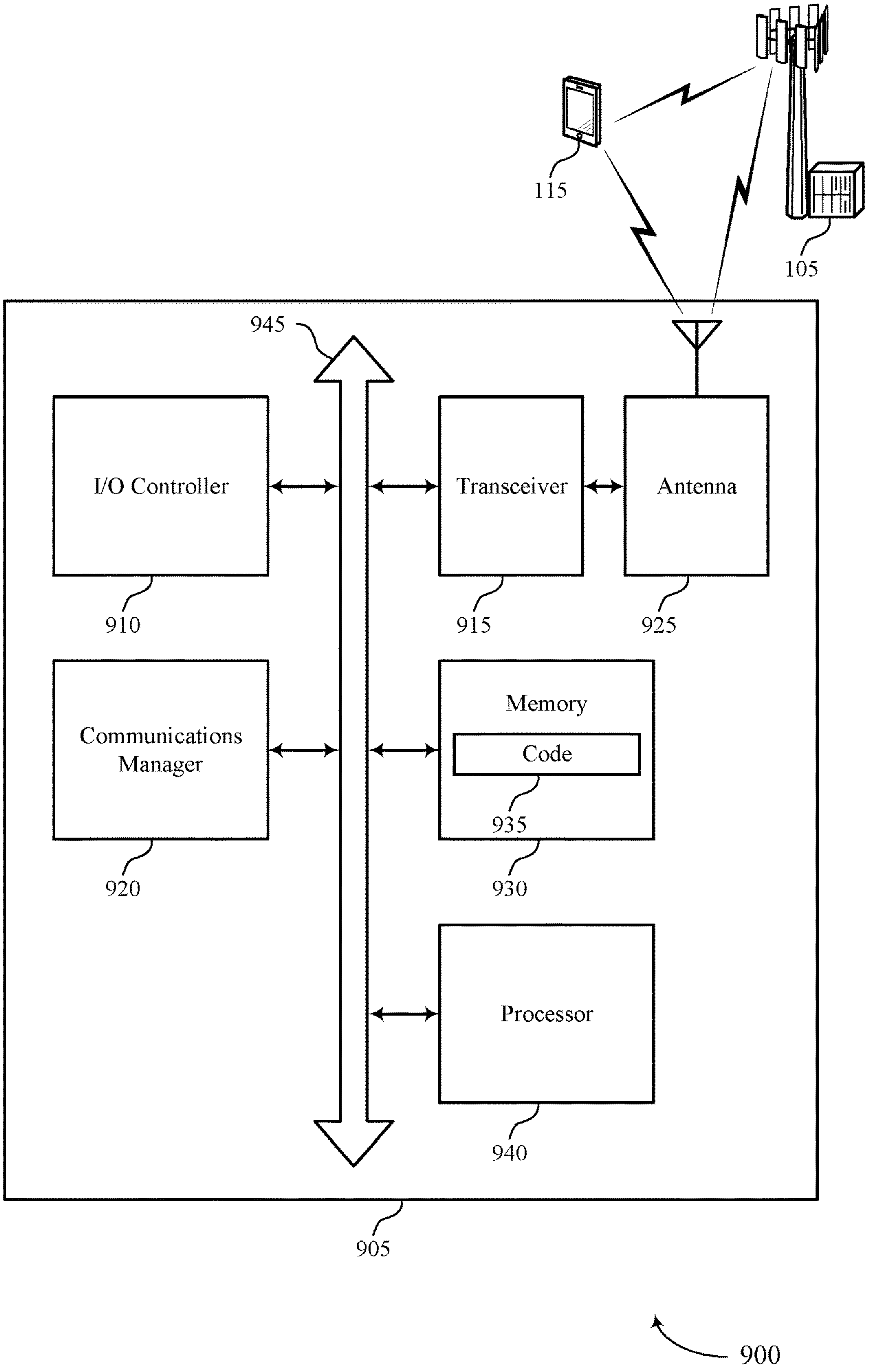
FIG. 9 shows a diagram of a system including a device that supports random access on eSUL cell in accordance with one or more aspects of the present disclosure.

FIG. 9 shows a diagram of a system 900 including a device 905 that supports random access on eSUL cell in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting random access on eSUL cell). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving a first indication of a first cell associated with a first uplink carrier and a first downlink carrier and a second cell associated with a second uplink carrier, where the second cell includes an uplink-only cell. The communications manager 920 is capable of, configured to, or operable to support a means for receiving, via the first downlink carrier of the first cell or via the second downlink carrier associated with a third cell, a second indication of subsequent communications to be performed via the first uplink carrier of the first cell, the second uplink carrier of the second cell, or both. The communications manager 920 is capable of, configured to, or operable to support a means for performing the subsequent communications according to the second indication, where the subsequent communications include at least one of access communications, uplink communications, or both.

By including or configuring the communications manager 920 in accordance with examples as described herein, the device 905 may support techniques for configuring a UE with a serving cell having both uplink and downlink carriers as well as an eSUL having only an uplink carrier. The eSUL may be separately configured for the UE (e.g., relative to the serving cell) via RRC signaling carrying or conveying the eSUL parameters for a single eSUL and/or for multiple eSULs.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of random access on eSUL cell as described herein, or the at least one processor 940 and the at least one memory 930 may be otherwise configured to, individually or collectively, perform or support such operations.

Figure 10:
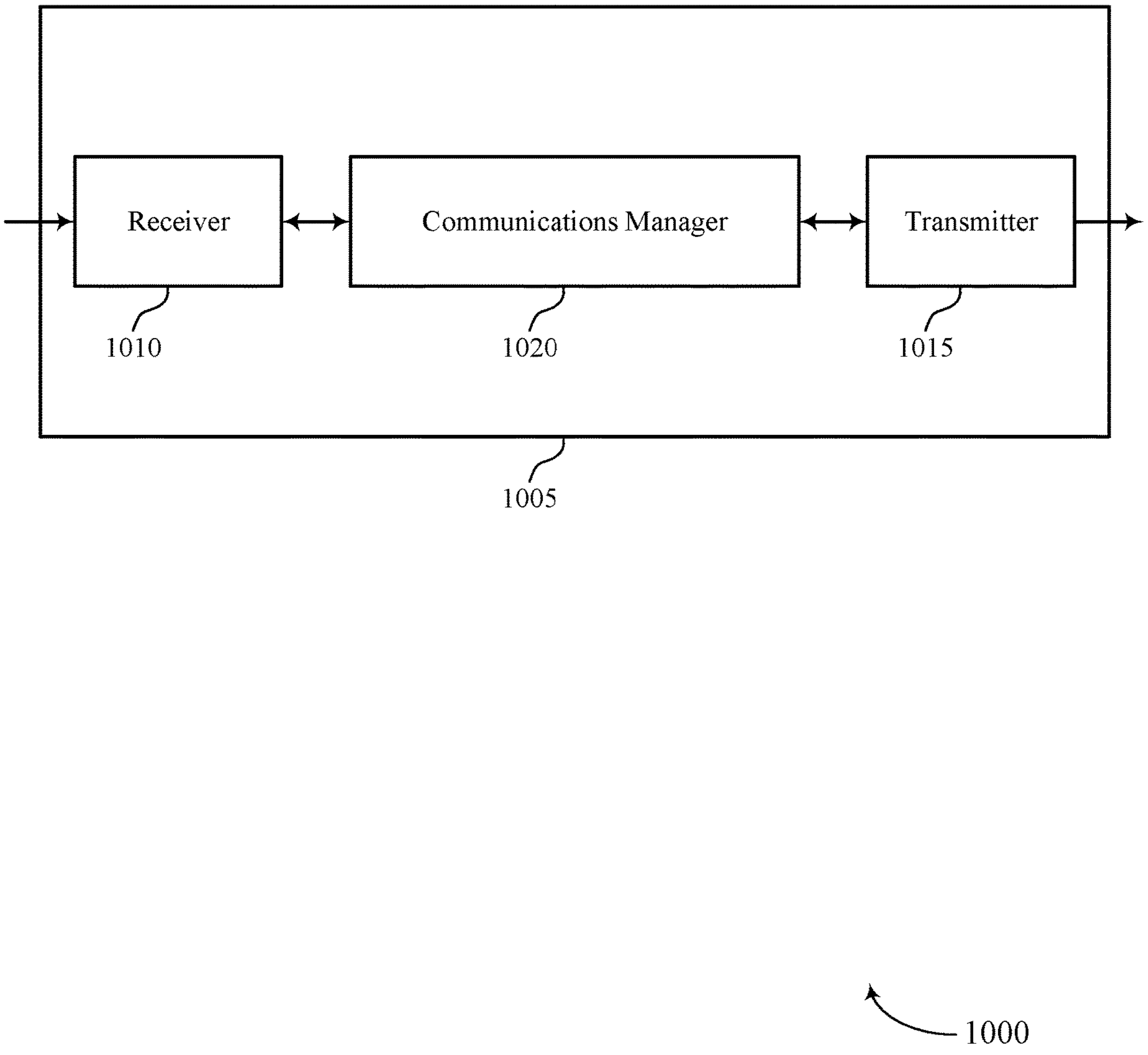
FIGS. 10 and 11 show block diagrams of devices that support random access on eSUL cell in accordance with one or more aspects of the present disclosure.

FIG. 10 shows a block diagram 1000 of a device 1005 that supports random access on eSUL cell in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of random access on eSUL cell as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, a first indication of a first cell associated with a first uplink carrier and a first downlink carrier and a second cell associated with a second uplink carrier, where the second cell includes an uplink-only cell. The communications manager 1020 is capable of, configured to, or operable to support a means for transmitting, to the UE and via the first downlink carrier of the first cell or via a second downlink carrier associated with a third cell, a second indication of subsequent communications to be performed via the first uplink carrier of the first cell, the second uplink carrier of the second cell, or both. The communications manager 1020 is capable of, configured to, or operable to support a means for performing the subsequent communications with the UE according to the second indication.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for configuring a UE with a serving cell having both uplink and downlink carriers as well as an eSUL having only an uplink carrier. The eSUL may be separately configured for the UE (e.g., relative to the serving cell) via RRC signaling carrying or conveying the eSUL parameters for a single eSUL and/or for multiple eSULs.

Figure 11:
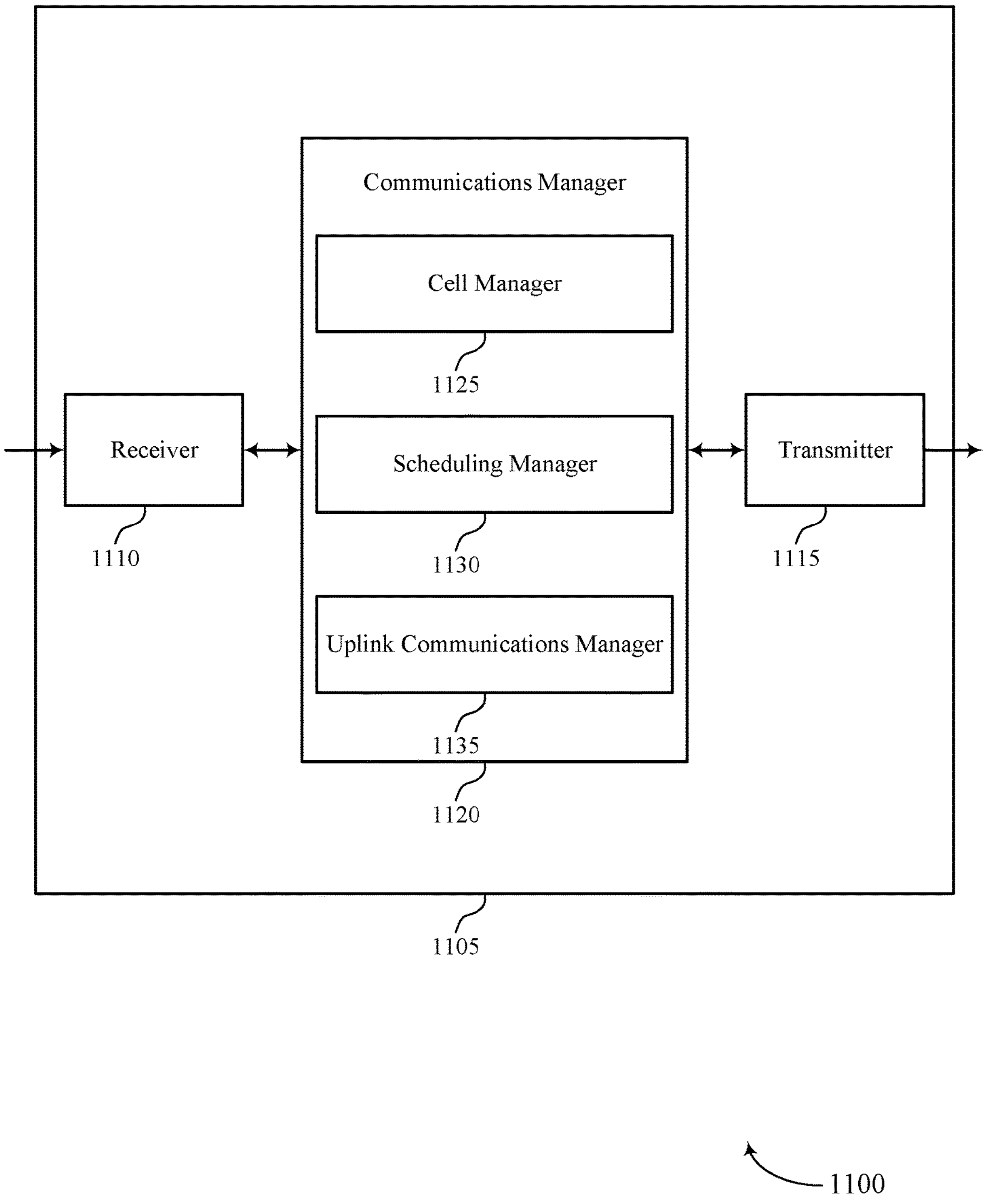

FIG. 11 shows a block diagram 1100 of a device 1105 that supports random access on eSUL cell in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one of more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of random access on eSUL cell as described herein. For example, the communications manager 1120 may include a cell manager 1125, a scheduling manager 1130, an uplink communications manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The cell manager 1125 is capable of, configured to, or operable to support a means for transmitting, to a UE, a first indication of a first cell associated with a first uplink carrier and a first downlink carrier and a second cell associated with a second uplink carrier, where the second cell includes an uplink-only cell. The scheduling manager 1130 is capable of, configured to, or operable to support a means for transmitting, to the UE and via the first downlink carrier of the first cell or via a second downlink carrier associated with a third cell, a second indication of subsequent communications to be performed via the first uplink carrier of the first cell, the second uplink carrier of the second cell, or both. The uplink communications manager 1135 is capable of, configured to, or operable to support a means for performing the subsequent communications with the UE according to the second indication.

Figure 12:
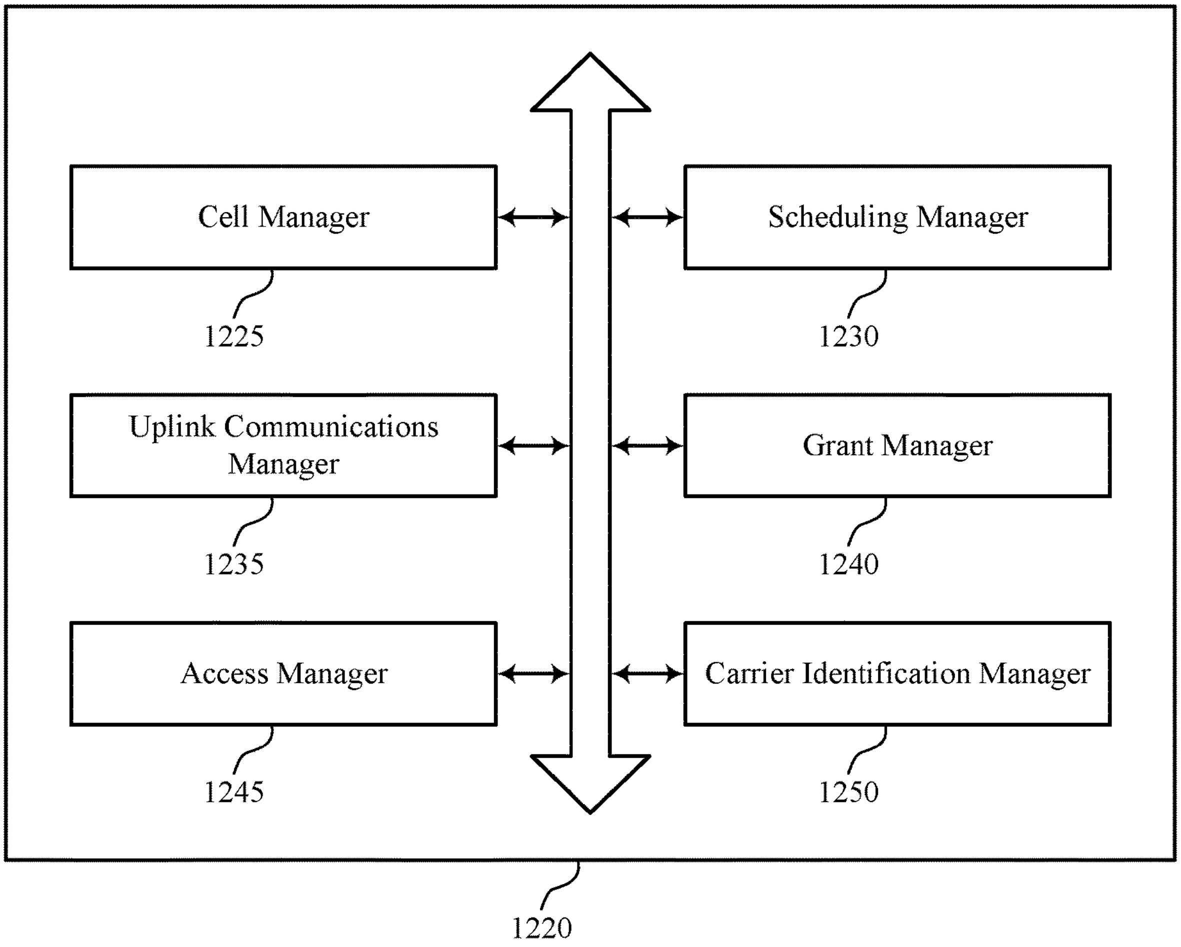
FIG. 12 shows a block diagram of a communications manager that supports random access on eSUL cell in accordance with one or more aspects of the present disclosure.

FIG. 12 shows a block diagram 1200 of a communications manager 1220 that supports random access on eSUL cell in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of random access on eSUL cell as described herein. For example, the communications manager 1220 may include a cell manager 1225, a scheduling manager 1230, an uplink communications manager 1235, a grant manager 1240, an access manager 1245, a carrier identification manager 1250, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The cell manager 1225 is capable of, configured to, or operable to support a means for transmitting, to a UE, a first indication of a first cell associated with a first uplink carrier and a first downlink carrier and a second cell associated with a second uplink carrier, where the second cell includes an uplink-only cell. The scheduling manager 1230 is capable of, configured to, or operable to support a means for transmitting, to the UE and via the first downlink carrier of the first cell or via a second downlink carrier associated with a third cell, a second indication of subsequent communications to be performed via the first uplink carrier of the first cell, the second uplink carrier of the second cell, or both. The uplink communications manager 1235 is capable of, configured to, or operable to support a means for performing the subsequent communications with the UE according to the second indication.

In some examples, to support transmitting the second indication, the grant manager 1240 is capable of, configured to, or operable to support a means for transmitting a grant scheduling an uplink communications with the UE via the first uplink carrier of the first cell, the second uplink carrier of the second cell, or both, where the subsequent communications includes the uplink communications. In some examples, the grant includes a cross-carrier scheduling grant, a multi-cell scheduling grant, or both.

In some examples, the grant manager 1240 is capable of, configured to, or operable to support a means for identifying a first feedback process associated with uplink communications via the first cell and a second feedback process associated with uplink communications via the second cell. In some examples, the grant manager 1240 is capable of, configured to, or operable to support a means for transmitting a reference signal transmitted to the UE via the first downlink carrier. In some examples, the grant manager 1240 is capable of, configured to, or operable to support a means for performing timing and power control operations with the UE using the reference signal.

In some examples, to support performing the subsequent communications, the grant manager 1240 is capable of, configured to, or operable to support a means for receiving uplink communications from the UE via the second uplink carrier of the second cell or transmitting downlink communications to the UE via the first downlink carrier of the first cell according to a half-duplexing scheme.

In some examples, to support transmitting the second indication, the access manager 1245 is capable of, configured to, or operable to support a means for transmitting a system information message to the UE identifying first access resources for access to the first cell via the first uplink carrier and second access resources for access to the second cell via the second uplink carrier, where the UE accesses the first cell or the second cell according to the first access resources or second access resources.

In some examples, the access manager 1245 is capable of, configured to, or operable to support a means for identifying a first access channel occasion corresponding to the first access resources and a second access channel occasion corresponding to the second access resources according to an access scheme based on the subsequent communications being scheduled in a TDD scheme.

In some examples, the carrier identification manager 1250 is capable of, configured to, or operable to support a means for identifying, based on the first indication, information for an uplink configuration, a TDD uplink/downlink configuration, a set of candidate synchronization signal block indices, or any combination thereof, for the second uplink carrier of the second cell. In some examples, the information is carried in an eSUL carrier sequence indication. In some examples, the information is carried in a serving cell configuration common system information block eSUL carrier indication.

Figure 13:
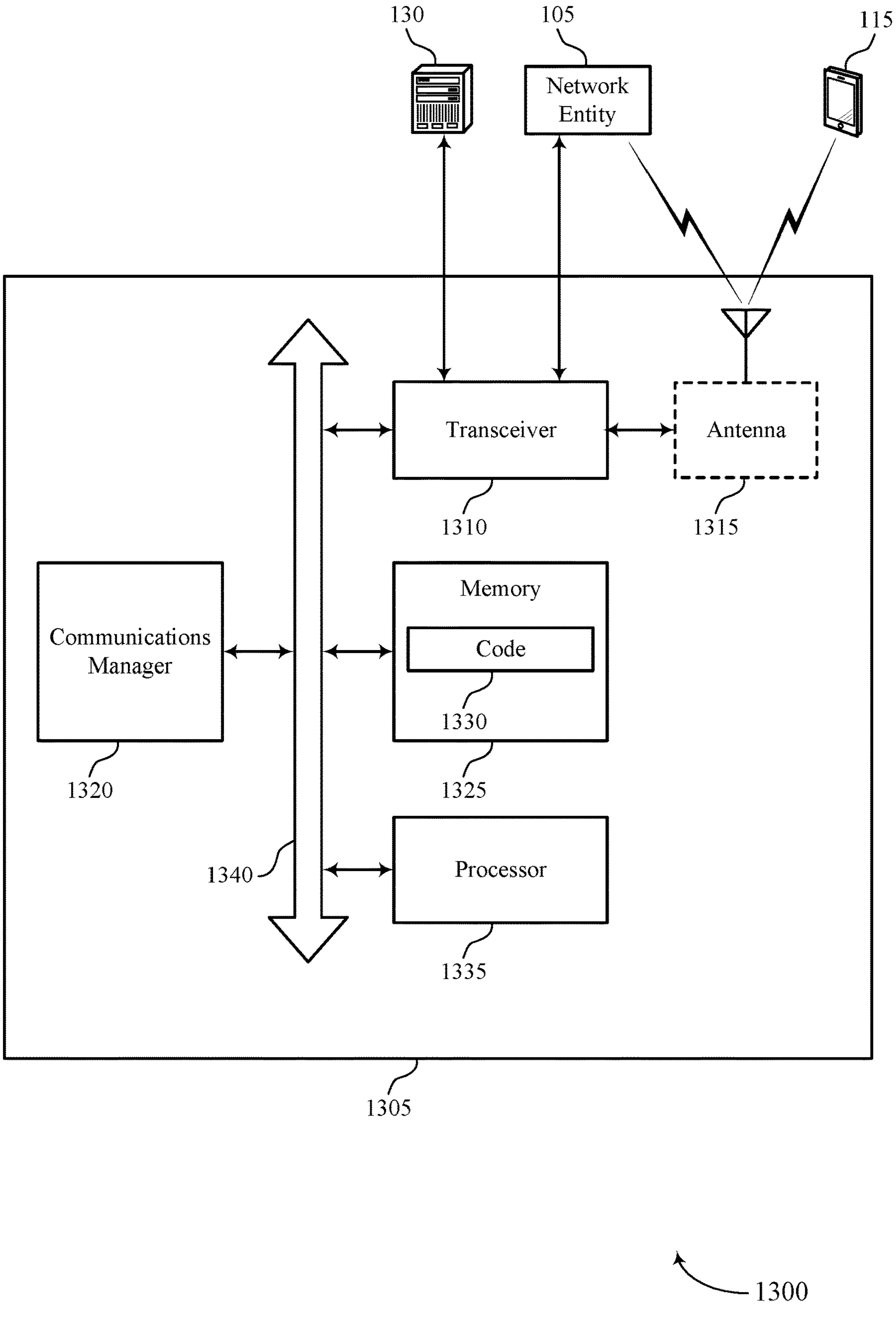
FIG. 13 shows a diagram of a system including a device that supports random access on eSUL cell in accordance with one or more aspects of the present disclosure.

FIG. 13 shows a diagram of a system 1300 including a device 1305 that supports random access on eSUL cell in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting random access on eSUL cell). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105 and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, a first indication of a first cell associated with a first uplink carrier and a first downlink carrier and a second cell associated with a second uplink carrier, where the second cell includes an uplink-only cell. The communications manager 1320 is capable of, configured to, or operable to support a means for transmitting, to the UE and via the first downlink carrier of the first cell or via a second downlink carrier associated with a third cell, a second indication of subsequent communications to be performed via the first uplink carrier of the first cell, the second uplink carrier of the second cell, or both. The communications manager 1320 is capable of, configured to, or operable to support a means for performing the subsequent communications with the UE according to the second indication.

By including or configuring the communications manager 1320 in accordance with examples as described herein, the device 1305 may support techniques for configuring a UE with a serving cell having both uplink and downlink carriers as well as an eSUL having only an uplink carrier. The eSUL may be separately configured for the UE (e.g., relative to the serving cell) via RRC signaling carrying or conveying the eSUL parameters for a single eSUL and/or for multiple eSULs.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of random access on eSUL cell as described herein, or the at least one processor 1335 and the at least one memory 1325 may be otherwise configured to, individually or collectively, perform or support such operations.

Figure 14:
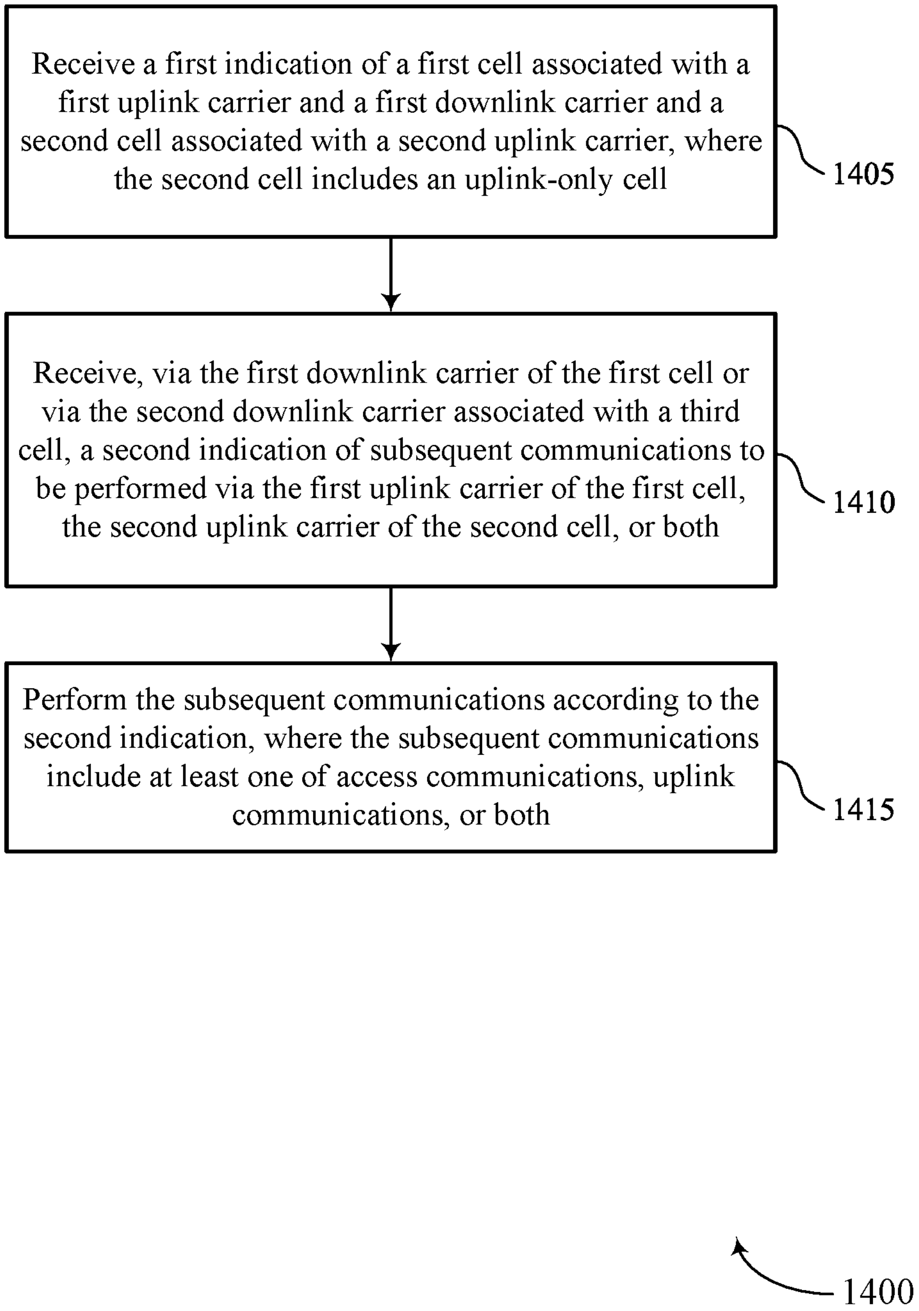
FIGS. 14 through 18 show flowcharts illustrating methods that support random access on eSUL cell in accordance with one or more aspects of the present disclosure.

FIG. 14 shows a flowchart illustrating a method 1400 that supports random access on eSUL cell in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first indication of a first cell associated with a first uplink carrier and a first downlink carrier and a second cell associated with a second uplink carrier, where the second cell includes an uplink-only cell. The operations of block 1405 may be performed in accordance with examples as disclosed herein. In some examples, aspects of the operations of 1405 may be performed by a cell manager 825 as described with reference to FIG. 8.

At 1410, the method may include receiving, via the first downlink carrier of the first cell or via the second downlink carrier associated with a third cell, a second indication of subsequent communications to be performed via the first uplink carrier of the first cell, the second uplink carrier of the second cell, or both. The operations of block 1410 may be performed in accordance with examples as disclosed herein. In some examples, aspects of the operations of 1410 may be performed by a scheduling manager 830 as described with reference to FIG. 8.

At 1415, the method may include performing the subsequent communications according to the second indication, where the subsequent communications include at least one of access communications, uplink communications, or both. The operations of block 1415 may be performed in accordance with examples as disclosed herein. In some examples, aspects of the operations of 1415 may be performed by an uplink communications manager 835 as described with reference to FIG. 8.

Figure 15:
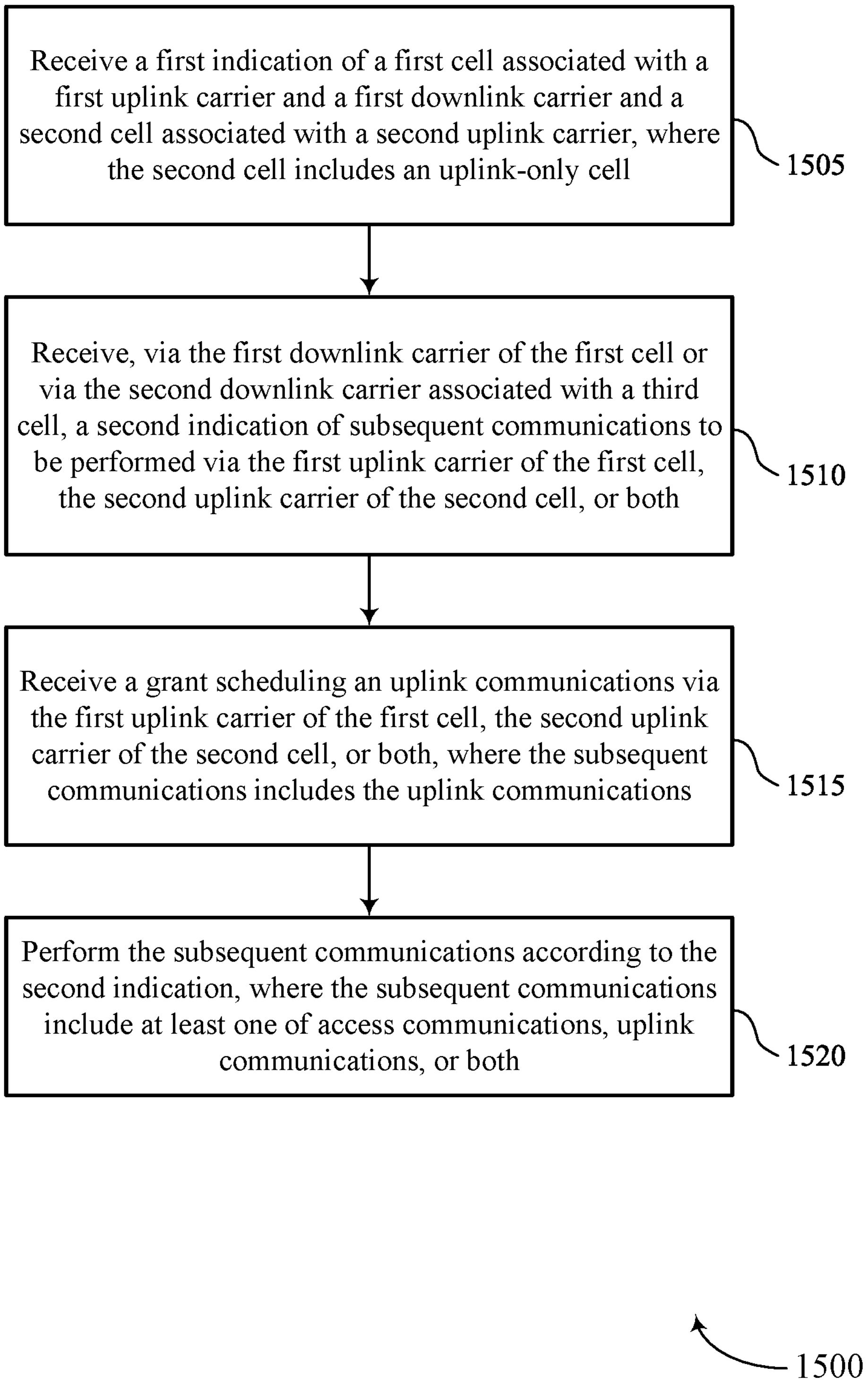

FIG. 15 shows a flowchart illustrating a method 1500 that supports random access on eSUL cell in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first indication of a first cell associated with a first uplink carrier and a first downlink carrier and a second cell associated with a second uplink carrier, where the second cell includes an uplink-only cell. The operations of block 1505 may be performed in accordance with examples as disclosed herein. In some examples, aspects of the operations of 1505 may be performed by a cell manager 825 as described with reference to FIG. 8.

At 1510, the method may include receiving, via the first downlink carrier of the first cell or via the second downlink carrier associated with a third cell, a second indication of subsequent communications to be performed via the first uplink carrier of the first cell, the second uplink carrier of the second cell, or both. The operations of block 1510 may be performed in accordance with examples as disclosed herein. In some examples, aspects of the operations of 1510 may be performed by a scheduling manager 830 as described with reference to FIG. 8.

At 1515, the method may include receiving a grant scheduling an uplink communications via the first uplink carrier of the first cell, the second uplink carrier of the second cell, or both, where the subsequent communications includes the uplink communications. The operations of block 1515 may be performed in accordance with examples as disclosed herein. In some examples, aspects of the operations of 1515 may be performed by a grant manager 840 as described with reference to FIG. 8.

At 1520, the method may include performing the subsequent communications according to the second indication, where the subsequent communications include at least one of access communications, uplink communications, or both. The operations of block 1520 may be performed in accordance with examples as disclosed herein. In some examples, aspects of the operations of 1520 may be performed by an uplink communications manager 835 as described with reference to FIG. 8.

Figure 16:
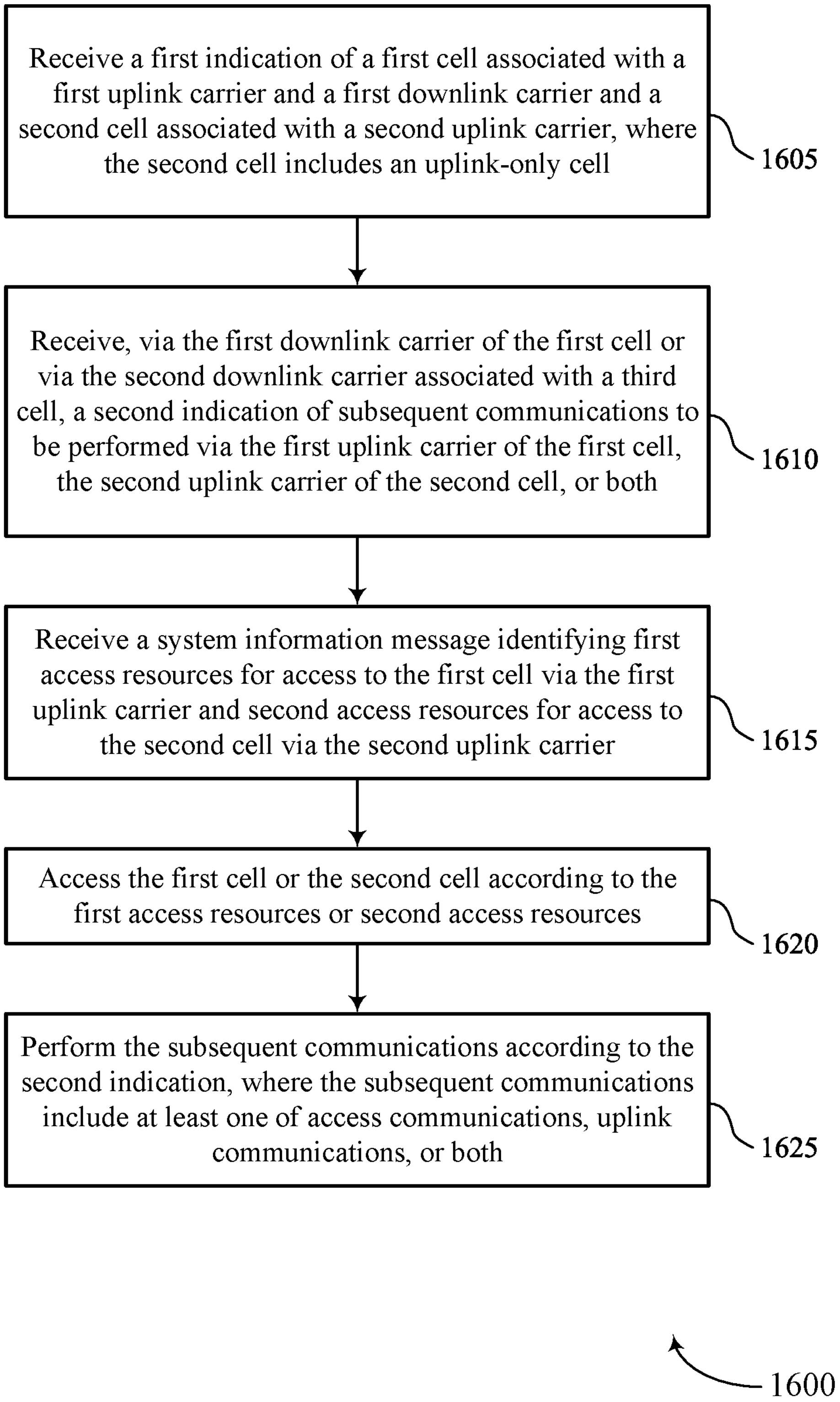

FIG. 16 shows a flowchart illustrating a method 1600 that supports random access on eSUL cell in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first indication of a first cell associated with a first uplink carrier and a first downlink carrier and a second cell associated with a second uplink carrier, where the second cell includes an uplink-only cell. The operations of block 1605 may be performed in accordance with examples as disclosed herein. In some examples, aspects of the operations of 1605 may be performed by a cell manager 825 as described with reference to FIG. 8.

At 1610, the method may include receiving, via the first downlink carrier of the first cell or via the second downlink carrier associated with a third cell, a second indication of subsequent communications to be performed via the first uplink carrier of the first cell, the second uplink carrier of the second cell, or both. The operations of block 1610 may be performed in accordance with examples as disclosed herein. In some examples, aspects of the operations of 1610 may be performed by a scheduling manager 830 as described with reference to FIG. 8.

At 1615, the method may include receiving a system information message identifying first access resources for access to the first cell via the first uplink carrier and second access resources for access to the second cell via the second uplink carrier. The operations of block 1615 may be performed in accordance with examples as disclosed herein. In some examples, aspects of the operations of 1615 may be performed by an access manager 845 as described with reference to FIG. 8.

At 1620, the method may include accessing the first cell or the second cell according to the first access resources or second access resources. The operations of block 1620 may be performed in accordance with examples as disclosed herein. In some examples, aspects of the operations of 1620 may be performed by an access manager 845 as described with reference to FIG. 8.

At 1625, the method may include performing the subsequent communications according to the second indication, where the subsequent communications include at least one of access communications, uplink communications, or both. The operations of block 1625 may be performed in accordance with examples as disclosed herein. In some examples, aspects of the operations of 1625 may be performed by an uplink communications manager 835 as described with reference to FIG. 8.

Figure 17:
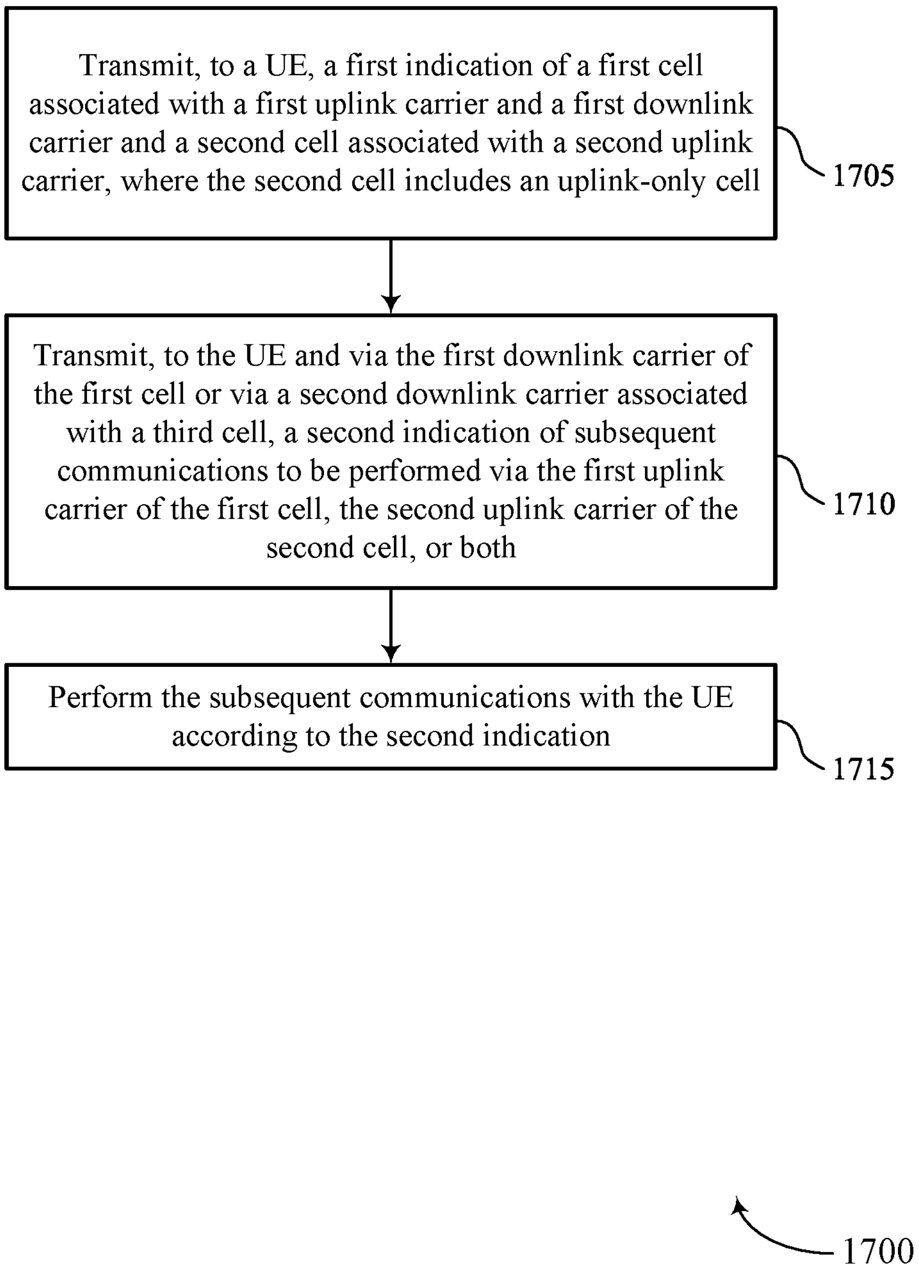

FIG. 17 shows a flowchart illustrating a method 1700 that supports random access on eSUL cell in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, a first indication of a first cell associated with a first uplink carrier and a first downlink carrier and a second cell associated with a second uplink carrier, where the second cell includes an uplink-only cell. The operations of block 1705 may be performed in accordance with examples as disclosed herein. In some examples, aspects of the operations of 1705 may be performed by a cell manager 1225 as described with reference to FIG. 12.

At 1710, the method may include transmitting, to the UE and via the first downlink carrier of the first cell or via a second downlink carrier associated with a third cell, a second indication of subsequent communications to be performed via the first uplink carrier of the first cell, the second uplink carrier of the second cell, or both. The operations of block 1710 may be performed in accordance with examples as disclosed herein. In some examples, aspects of the operations of 1710 may be performed by a scheduling manager 1230 as described with reference to FIG. 12.

At 1715, the method may include performing the subsequent communications with the UE according to the second indication. The operations of block 1715 may be performed in accordance with examples as disclosed herein. In some examples, aspects of the operations of 1715 may be performed by an uplink communications manager 1235 as described with reference to FIG. 12.

Figure 18:
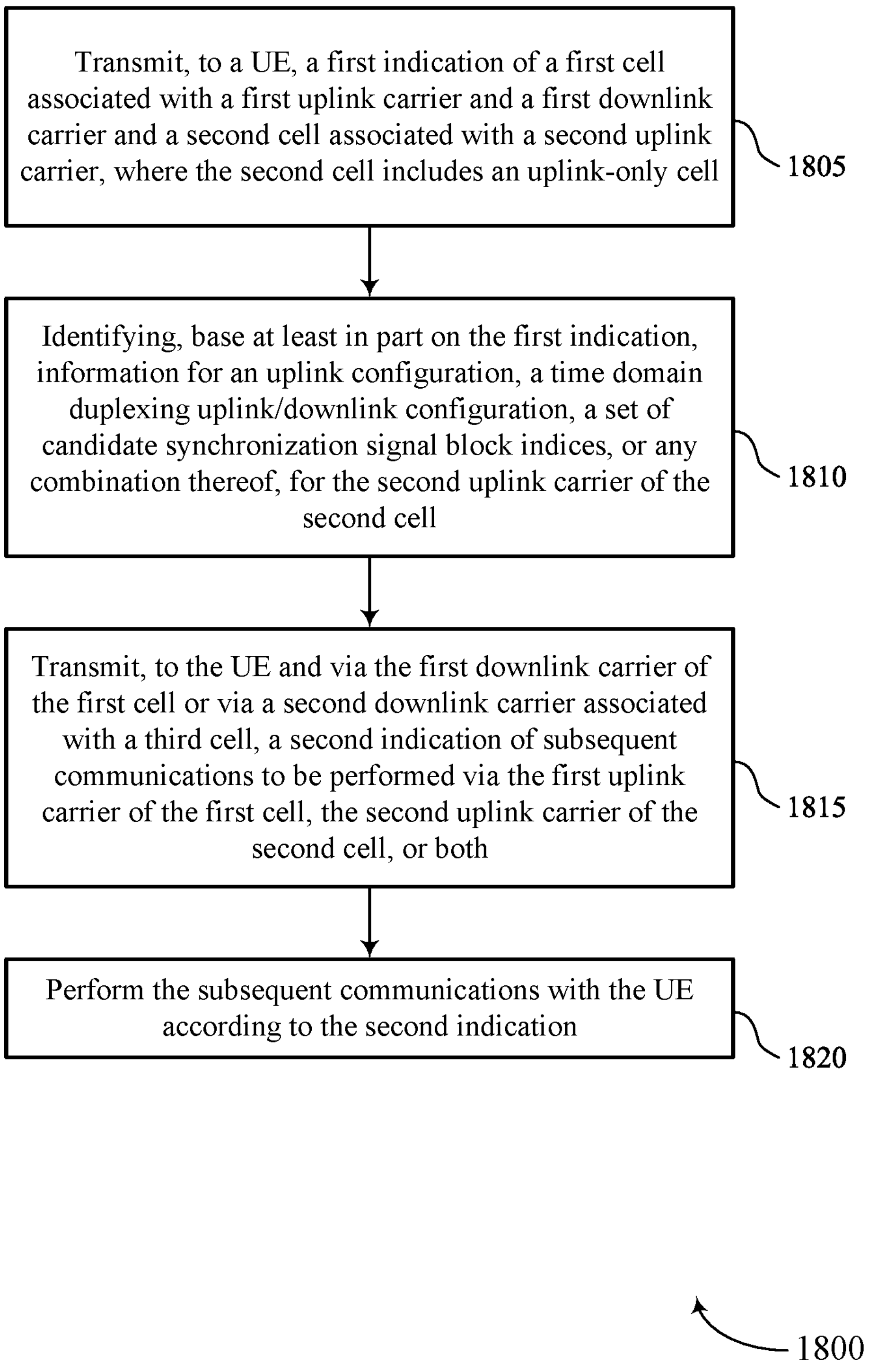

FIG. 18 shows a flowchart illustrating a method 1800 that supports random access on eSUL cell in accordance with aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, a first indication of a first cell associated with a first uplink carrier and a first downlink carrier and a second cell associated with a second uplink carrier, where the second cell includes an uplink-only cell. The operations of block 1805 may be performed in accordance with examples as disclosed herein. In some examples, aspects of the operations of 1805 may be performed by a cell manager 1225 as described with reference to FIG. 12.

At 1810, the method may include identifying, based on the first indication, information for an uplink configuration, a TDD uplink/downlink configuration, a set of candidate synchronization signal block indices, or any combination thereof, for the second uplink carrier of the second cell. The operations of block 1810 may be performed in accordance with examples as disclosed herein. In some examples, aspects of the operations of 1810 may be performed by a carrier identification manager 1250 as described with reference to FIG. 12.

At 1815, the method may include transmitting, to the UE and via the first downlink carrier of the first cell or via a second downlink carrier associated with a third cell, a second indication of subsequent communications to be performed via the first uplink carrier of the first cell, the second uplink carrier of the second cell, or both. The operations of block 1815 may be performed in accordance with examples as disclosed herein. In some examples, aspects of the operations of 1815 may be performed by a scheduling manager 1230 as described with reference to FIG. 12.

At 1820, the method may include performing the subsequent communications with the UE according to the second indication. The operations of block 1820 may be performed in accordance with examples as disclosed herein. In some examples, aspects of the operations of 1820 may be performed by an uplink communications manager 1235 as described with reference to FIG. 12.

The following provides an overview of aspects of the present disclosure:

Aspect 1: A method for wireless communications at a UE, comprising: receiving a first indication of a first cell associated with a first uplink carrier and a first downlink carrier and a second cell associated with a second uplink carrier, wherein the second cell comprises an uplink-only cell; receiving, via the first downlink carrier of the first cell or via the second downlink carrier associated with a third cell, a second indication of subsequent communications to be performed via the first uplink carrier of the first cell, the second uplink carrier of the second cell, or both; and performing the subsequent communications according to the second indication, wherein the subsequent communications comprise at least one of access communications, uplink communications, or both.

Aspect 2: The method of aspect 1, wherein receiving the second indication comprises: receiving a grant scheduling an uplink communications via the first uplink carrier of the first cell, the second uplink carrier of the second cell, or both, wherein the subsequent communications comprises the uplink communications.

Aspect 3: The method of aspect 2, wherein the grant comprises a cross-carrier scheduling grant, a multi-cell scheduling grant, or both.

Aspect 4: The method of any of aspects 2 through 3, further comprising: identifying a first feedback process associated with uplink communications via the first cell and a second feedback process associated with uplink communications via the second cell.

Aspect 5: The method of any of aspects 2 through 4, further comprising: receiving a reference signal transmitted via the first downlink carrier of the first cell, via the second downlink carrier associated with a third cell, or both; and performing timing and power control operations using the reference signal.

Aspect 6: The method of any of aspects 2 through 5, wherein performing the subsequent communications comprises: transmitting uplink communications via the second uplink carrier of the second cell according or receiving downlink communications via the first downlink carrier of the first cell according to a half-duplexing scheme.

Aspect 7: The method of any of aspects 2 through 6, wherein performing the subsequent communications comprises: performing either simultaneous transmissions on the first uplink carrier of the first cell and transmissions on the second uplink carrier of the second cell according to a simultaneous transmit antenna switching scheme, or non-simultaneous transmissions on the first uplink carrier of the first cell and transmissions on the second uplink carrier of the second cell according to an uplink transmit antenna switching scheme.

Aspect 8: The method of any of aspects 1 through 7, wherein receiving the second indication comprises: receiving a system information message identifying first access resources for access to the first cell via the first uplink carrier and second access resources for access to the second cell via the second uplink carrier; and accessing the first cell or the second cell according to the first access resources or second access resources.

Aspect 9: The method of aspect 8, further comprising: identifying a first access channel occasion corresponding to the first access resources and a second access channel occasion corresponding to the second access resources according to an access scheme based on the subsequent communications being scheduled in a TDD scheme.

Aspect 10: The method of any of aspects 1 through 9, further comprising: identifying, based at least in part on the first indication, information for an uplink configuration, a TDD uplink/downlink configuration, a set of candidate synchronization signal block indices, or any combination thereof, for the second uplink carrier of the second cell.

Aspect 11: The method of aspect 10, wherein the information is carried in an eSUL carrier sequence indication.

Aspect 12: The method of any of aspects 10 through 11, wherein the information is carried in a serving cell configuration common system information block eSUL carrier indication.

Aspect 13: A method for wireless communications at a network entity, comprising: transmitting, to a UE, a first indication of a first cell associated with a first uplink carrier and a first downlink carrier and a second cell associated with a second uplink carrier, wherein the second cell comprises an uplink-only cell; transmitting, to the UE and via the first downlink carrier of the first cell or via a second downlink carrier associated with a third cell, a second indication of subsequent communications to be performed via the first uplink carrier of the first cell, the second uplink carrier of the second cell, or both; and performing the subsequent communications with the UE according to the second indication.

Aspect 14: The method of aspect 13, wherein transmitting the second indication comprises: transmitting a grant scheduling an uplink communications with the UE via the first uplink carrier of the first cell, the second uplink carrier of the second cell, or both, wherein the subsequent communications comprises the uplink communications.

Aspect 15: The method of aspect 14, wherein the grant comprises a cross-carrier scheduling grant, a multi-cell scheduling grant, or both.

Aspect 16: The method of any of aspects 14 through 15, further comprising: identifying a first feedback process associated with uplink communications via the first cell and a second feedback process associated with uplink communications via the second cell.

Aspect 17: The method of any of aspects 14 through 16, further comprising: transmitting a reference signal transmitted to the UE via the first downlink carrier; and performing timing and power control operations with the UE using the reference signal.

Aspect 18: The method of any of aspects 14 through 17, wherein performing the subsequent communications comprises: receiving uplink communications from the UE via the second uplink carrier of the second cell or transmitting downlink communications to the UE via the first downlink carrier of the first cell according to a half-duplexing scheme.

Aspect 19: The method of any of aspects 13 through 18, wherein transmitting the second indication comprises: transmitting a system information message to the UE identifying first access resources for access to the first cell via the first uplink carrier and second access resources for access to the second cell via the second uplink carrier, wherein the UE accesses the first cell or the second cell according to the first access resources or second access resources.

Aspect 20: The method of aspect 19, further comprising: identifying a first access channel occasion corresponding to the first access resources and a second access channel occasion corresponding to the second access resources according to an access scheme based on the subsequent communications being scheduled in a TDD scheme.

Aspect 21: The method of any of aspects 13 through 20, further comprising: identifying, based at least in part on the first indication, information for an uplink configuration, a TDD uplink/downlink configuration, a set of candidate synchronization signal block indices, or any combination thereof, for the second uplink carrier of the second cell.

Aspect 22: The method of aspect 21, wherein the information is carried in an eSUL carrier sequence indication.

Aspect 23: The method of any of aspects 21 through 22, wherein the information is carried in a serving cell configuration common system information block eSUL carrier indication.

Aspect 24: A UE for wireless communications, comprising one or more memories storing processor-executable code, and one or more processors coupled with the one or more memories and individually or collectively operable to execute the code to cause the UE to perform a method of any of aspects 1 through 12.

Aspect 25: A UE for wireless communications, comprising at least one means for performing a method of any of aspects 1 through 12.

Aspect 26: A non-transitory computer-readable medium storing code for wireless communications, the code comprising instructions executable by a processor to perform a method of any of aspects 1 through 12.

Aspect 27: A network entity for wireless communications, comprising one or more memories storing processor-executable code, and one or more processors coupled with the one or more memories and individually or collectively operable to execute the code to cause the network entity to perform a method of any of aspects 13 through 23.

Aspect 28: A network entity for wireless communications, comprising at least one means for performing a method of any of aspects 13 through 23.

Aspect 29: A non-transitory computer-readable medium storing code for wireless communications, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

at least one memory;

at least one transceiver; and at least one processor, the at least one processor coupled with the at least one memory and the at least one transceiver and configured to:

receive, via the at least one transceiver, a message comprising a configuration for indicating a cell with both uplink and downlink carriers and an uplink-only cell, wherein the message comprises a first indication of a first cell associated with a first uplink carrier and a first downlink carrier and a second cell associated with a second uplink carrier, wherein the second cell comprises the uplink-only cell;

receive, via the at least one transceiver and via the first downlink carrier of the first cell or via a second downlink carrier associated with a third cell, a second indication of subsequent communications to be performed via the second uplink carrier of the second cell, wherein the second indication comprises control information for random access on the second uplink carrier; and perform the subsequent communications according to the second indication, wherein the subsequent communications comprise at least one of access communications, uplink communications, or both.

2. The UE of claim 1, wherein, to receive the second indication, the at least one processor is further configured to:

receive, via the first downlink carrier of the first cell or via the second downlink carrier of the third cell, a grant scheduling uplink communications via the second uplink carrier of the second cell, wherein the subsequent communications comprises the uplink communications.

3. The UE of claim 2, wherein the grant comprises a cross-carrier scheduling grant, a multi-cell scheduling grant, or both.

4. The UE of claim 2, wherein the at least one processor is further configured to:

identify a first feedback process associated with uplink communications via the first cell and a second feedback process associated with uplink communications via the second cell.

5. The UE of claim 2, wherein the at least one processor is further configured to:

receive a reference signal transmitted via the first downlink carrier of the first cell, via the second downlink carrier associated with a third cell, or both; and perform timing and power control operations for the uplink communications via the second uplink carrier of the second cell using the reference signal.

6. The UE of claim 2, wherein, to perform the subsequent communications, the at least one processor is further configured to:

transmit uplink communications via the second uplink carrier of the second cell or receive downlink communications via the first downlink carrier of the first cell according to a half-duplexing scheme.

7. The UE of claim 2, wherein, to perform the subsequent communications, the at least one processor is further configured to:

perform either simultaneous transmissions on the first uplink carrier of the first cell and transmissions on the second uplink carrier of the second cell according to a simultaneous transmit antenna switching scheme, or non-simultaneous transmissions on the first uplink carrier of the first cell and transmissions on the second uplink carrier of the second cell according to an uplink transmit antenna switching scheme.

8. The UE of claim 1, wherein, to receive the second indication, the at least one processor is further configured to:

receive a system information message identifying first access resources for access to the first cell via the first uplink carrier and second access resources for access to the second cell via the second uplink carrier; and access the first cell or the second cell according to the first access resources or second access resources.

9. The UE of claim 8, wherein the at least one processor is further configured to:

identify a first access channel occasion corresponding to the first access resources and a second access channel occasion corresponding to the second access resources according to an access scheme based on the subsequent communications being scheduled in a time domain duplexing scheme.

10. The UE of claim 1, wherein the at least one processor is further configured to:

identify, based at least in part on the first indication, information for an uplink configuration, a time domain duplexing uplink/downlink configuration, a set of candidate synchronization signal block indices, or any combination thereof, for the second uplink carrier of the second cell.

11. The UE of claim 10, wherein the information is carried in an enhanced secondary uplink carrier sequence indication.

12. The UE of claim 10, wherein the information is carried in a serving cell configuration common system information block enhanced secondary uplink carrier indication.

13. A network entity, comprising:

at least one memory; and at least one processor, the at least one processor coupled with the at least one memory and configured to:

transmit, to a user equipment (UE), a message comprising a configuration for indicating a cell with both uplink and downlink carriers and an uplink-only cell, wherein the message comprises a first indication of a first cell associated with a first uplink carrier and a first downlink carrier and a second cell associated with a second uplink carrier, wherein the second cell comprises an uplink-only cell;

transmit, to the UE and via the first downlink carrier of the first cell or via a second downlink carrier associated with a third cell, a second indication of subsequent communications to be performed via the second uplink carrier of the second cell, wherein the second indication comprises control information for random access on the second uplink carrier; and perform the subsequent communications with the UE according to the second indication.

14. The network entity of claim 13, wherein, to transmit the second indication, the at least one processor is further configured to:

transmit a grant scheduling uplink communications with the UE via the second uplink carrier of the second cell, wherein the subsequent communications comprises the uplink communications.

15. The network entity of claim 14, wherein the grant comprises a cross-carrier scheduling grant, a multi-cell scheduling grant, or both.

16. The network entity of claim 14, wherein the at least one processor is further configured to:

identify a first feedback process associated with uplink communications via the first cell and a second feedback process associated with uplink communications via the second cell.

17. The network entity of claim 14, wherein the at least one processor is further configured to:

transmit a reference signal transmitted to the UE via the first downlink carrier; and perform timing and power control operations with the UE using the reference signal.

18. The network entity of claim 14, wherein, to perform the subsequent communications, the at least one processor is further configured to:

receive uplink communications from the UE via the second uplink carrier of the second cell or transmitting downlink communications to the UE via the first downlink carrier of the first cell according to a half-duplexing scheme.

19. The network entity of claim 13, wherein, to transmit the second indication, the at least one processor is further configured to:

transmit a system information message to the UE identifying first access resources for access to the first cell via the first uplink carrier and second access resources for access to the second cell via the second uplink carrier, wherein the UE accesses the first cell or the second cell according to the first access resources or second access resources.

20. The network entity of claim 19, wherein the at least one processor is further configured to:

identify a first access channel occasion corresponding to the first access resources and a second access channel occasion corresponding to the second access resources according to an access scheme based on the subsequent communications being scheduled in a time domain duplexing scheme.

21. The network entity of claim 13, wherein the at least one processor is further configured to:

identify, based at least in part on the first indication, information for an uplink configuration, a time domain duplexing uplink/downlink configuration, a set of candidate synchronization signal block indices, or any combination thereof, for the second uplink carrier of the second cell.

22. The network entity of claim 21, wherein the information is carried in an enhanced secondary uplink carrier sequence indication.

23. The network entity of claim 21, wherein the information is carried in a serving cell configuration common system information block enhanced secondary uplink carrier indication.

24. A method for wireless communications at a user equipment (UE), comprising:

receiving a message comprising a configuration for indicating a cell with both uplink and downlink carriers and an uplink-only cell, wherein the message comprises a first indication of a first cell associated with a first uplink carrier and a first downlink carrier and a second cell associated with a second uplink carrier, wherein the second cell comprises the uplink-only cell;

receiving, via the first downlink carrier of the first cell or via a second downlink carrier associated with a third cell, a second indication of subsequent communications to be performed via the second uplink carrier of the second cell, wherein the second indication comprises control information for random access on the second uplink carrier; and performing the subsequent communications according to the second indication, wherein the subsequent communications comprise at least one of access communications, uplink communications, or both.

25. The method of claim 24, wherein receiving the second indication comprises:

receiving a grant scheduling uplink communications via the second uplink carrier of the second cell, wherein the subsequent communications comprises the uplink communications.

26. The method of claim 25, wherein the grant comprises a cross-carrier scheduling grant, a multi-cell scheduling grant, or both.

27. The method of claim 25, further comprising:

identifying a first feedback process associated with uplink communications via the first cell and a second feedback process associated with uplink communications via the second cell.

28. The method of claim 25, further comprising:

receiving a reference signal transmitted via the first downlink carrier of the first cell, via the second downlink carrier associated with a third cell, or both; and performing timing and power control operations using the reference signal.

29. The method of claim 25, wherein performing the subsequent communications comprises:

transmitting uplink communications via the second uplink carrier of the second cell or receiving downlink communications via the first downlink carrier of the first cell according to a half-duplexing scheme.

30. A method for wireless communications at a network entity, comprising:

transmitting, to a user equipment (UE), a message comprising a configuration for indicating a cell with both uplink and downlink carriers and an uplink-only cell, wherein the message comprises a first indication of a first cell associated with a first uplink carrier and a first downlink carrier and a second cell associated with a second uplink carrier, wherein the second cell comprises the uplink-only cell;

transmitting, to the UE and via the first downlink carrier of the first cell or via a second downlink carrier associated with a third cell, a second indication of subsequent communications to be performed via the second uplink carrier of the second cell, wherein the second indication comprises control information for random access on the second uplink carrier; and performing the subsequent communications with the UE according to the second indication.

* * * * *